United States Patent
Naismith et al.

(10) Patent No.: US 10,928,563 B2
(45) Date of Patent: Feb. 23, 2021

(54) MICROSTRUCTURED DIFFUSER COMPRISING FIRST MICROSTRUCTURED LAYER AND COATING, OPTICAL STACKS, AND METHOD

(71) Applicant: 3M INNOVATIVE PROPERTIES COMPANY, St. Paul, MN (US)

(72) Inventors: Nathaniel K. Naismith, St. Paul, MN (US); William F. Edmonds, Minneapolis, MN (US); Jason S. Petaja, Cottage Grove, MN (US); Brandt K. Carter, North Myrtle Beach, SC (US); Jeffrey L. Solomon, Vadnais Heights, MN (US); Sara S. Merritt, Minneapolis, MN (US); Tri D. Pham, Woodbury, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 983 days.

(21) Appl. No.: 15/023,437

(22) PCT Filed: Sep. 24, 2014

(86) PCT No.: PCT/US2014/057082
§ 371 (c)(1),
(2) Date: Mar. 21, 2016

(87) PCT Pub. No.: WO2015/050750
PCT Pub. Date: Apr. 9, 2015

(65) Prior Publication Data
US 2016/0216413 A1 Jul. 28, 2016

Related U.S. Application Data

(60) Provisional application No. 61/885,723, filed on Oct. 2, 2013.

(51) Int. Cl.
*G02B 5/02* (2006.01)

(52) U.S. Cl.
CPC ......... *G02B 5/0242* (2013.01); *G02B 5/0221* (2013.01); *G02B 5/0268* (2013.01); *G02B 5/0278* (2013.01)

(58) Field of Classification Search
CPC ...... G02B 1/01–118; G02B 5/02–0289; G02B 5/0242; G02B 5/0221; G02B 5/0268; G02B 5/0278
(Continued)

(56) References Cited

U.S. PATENT DOCUMENTS

| 5,086,086 | A | 2/1992 | Brown-Wensley |
| 5,175,030 | A | 12/1992 | Lu |

(Continued)

FOREIGN PATENT DOCUMENTS

| CN | 101315160 | 1/2011 |
| CN | 101960334 | 1/2011 |

(Continued)

OTHER PUBLICATIONS

International Search Report for PCT International Application No. PCT/US2014/057082 dated Jan. 8, 2015, 4 pages.

*Primary Examiner* — William R Alexander
(74) *Attorney, Agent, or Firm* — Clifton F. Richardson; Carolyn A. Fischer

(57) ABSTRACT

A microstructured diffuser is described comprising a light transmissive film comprising a first microstructured surface comprising a plurality of peaks and valleys. A coating is disposed on the first microstructured surface. The coating partially fills the valleys forming a second microstructured surface.

19 Claims, 15 Drawing Sheets

(58) Field of Classification Search
USPC .......................................................... 359/599
See application file for complete search history.

(56) References Cited

U.S. PATENT DOCUMENTS

| | | | |
|---|---|---|---|
| 5,183,597 | A | 2/1993 | Lu |
| 5,252,694 | A | 10/1993 | Willett |
| 5,677,376 | A | 10/1997 | Groves |
| 5,820,957 | A | 10/1998 | Schroeder |
| 5,897,727 | A | 4/1999 | Staral |
| 5,998,495 | A | 12/1999 | Oxman |
| 6,180,200 | B1 | 1/2001 | Ha |
| 6,376,590 | B2 | 4/2002 | Kolb |
| 6,730,397 | B2 | 5/2004 | Melancon |
| 6,778,240 | B2 | 8/2004 | Nakmura |
| 6,842,288 | B1 | 1/2005 | Liu |
| 7,241,437 | B2 | 7/2007 | Davidson |
| 7,282,272 | B2 | 10/2007 | Jones |
| 7,328,638 | B2 | 2/2008 | Gardiner |
| 7,350,442 | B2 | 4/2008 | Ehnes |
| 7,526,164 | B2 | 4/2009 | Ouderkirk |
| 7,599,592 | B2 | 10/2009 | Benson, Jr. |
| 7,963,660 | B2 * | 6/2011 | Hamamoto ....... G02F 1/133502 359/601 |
| 8,263,863 | B2 | 9/2012 | Young |
| 8,351,119 | B2 * | 1/2013 | Yang .................... G02B 5/0231 359/599 |
| 8,547,639 | B2 * | 10/2013 | Watanabe ............ G02B 5/0278 359/599 |
| 9,581,731 | B2 * | 2/2017 | Bookbinder .......... G02B 5/021 |
| 2003/0124435 | A1 * | 7/2003 | Rich .................... G03H 1/0276 430/1 |
| 2004/0027676 | A1 * | 2/2004 | Nilsen .................. G02B 6/0053 359/619 |
| 2006/0027321 | A1 | 2/2006 | Schaffer |
| 2006/0029784 | A1 | 2/2006 | Doan |
| 2006/0204679 | A1 | 9/2006 | Jones et al. |
| 2006/0204718 | A1 * | 9/2006 | Kawakami ............... G02B 5/02 428/141 |
| 2007/0286994 | A1 | 12/2007 | Walker |
| 2007/0298193 | A1 | 12/2007 | Nakamura |
| 2008/0193721 | A1 | 8/2008 | Ukelis et al. |
| 2008/0221291 | A1 | 9/2008 | Invie |
| 2008/0286527 | A1 * | 11/2008 | Haga .................... G02B 5/0226 428/143 |
| 2009/0017256 | A1 | 1/2009 | Hunt |
| 2009/0041553 | A1 | 2/2009 | Burke |
| 2009/0086326 | A1 * | 4/2009 | Hamamoto ............. G02B 1/111 359/601 |
| 2010/0028600 | A1 * | 2/2010 | Kojima ................... G02B 1/111 428/141 |
| 2010/0079868 | A1 | 4/2010 | Asakura et al. |
| 2010/0167019 | A1 * | 7/2010 | Ohyanagi ................ G02B 5/02 428/172 |
| 2010/0177398 | A1 * | 7/2010 | Watanabe ................ G02B 1/14 359/614 |
| 2012/0113622 | A1 | 5/2012 | Aronson |
| 2012/0154811 | A1 | 6/2012 | Pokorny |
| 2013/0004728 | A1 | 1/2013 | Boyd |
| 2013/0038939 | A1 * | 2/2013 | Walker, Jr. ........... G02B 5/0242 359/601 |
| 2013/0135750 | A1 | 5/2013 | Walker, Jr. et al. |
| 2015/0331149 | A1 * | 11/2015 | Bookbinder ......... G02B 5/0221 359/601 |

FOREIGN PATENT DOCUMENTS

| | | |
|---|---|---|
| EP | 1962111 | 8/2008 |
| JP | 1993-004319 | 1/1993 |
| JP | 2002-31705 | 1/2002 |
| JP | 2005-156615 | 6/2005 |
| JP | 2006-113561 | 4/2006 |
| JP | 2009-053686 | 3/2009 |
| JP | 2009-204837 | 9/2009 |
| JP | 2010-085539 | 4/2010 |
| WO | WO 1998-12596 | 3/1998 |
| WO | WO 2000-048037 | 8/2000 |
| WO | WO 2004-104679 | 12/2004 |
| WO | WO 2008-112451 | 9/2008 |
| WO | WO 2009-079275 | 6/2009 |
| WO | WO 2010-074862 | 7/2010 |
| WO | WO 2010-141261 | 12/2010 |
| WO | WO 2010-141345 | 12/2010 |
| WO | WO 2011-028373 | 3/2011 |
| WO | WO 2011-056475 | 5/2011 |
| WO | WO 2011-130144 | 10/2011 |
| WO | WO 2011-130151 | 10/2011 |
| WO | WO 2011-130155 | 10/2011 |
| WO | WO 2011-140018 | 11/2011 |
| WO | WO 2012-050240 A1 | 4/2012 |
| WO | WO 2012-074814 | 6/2012 |
| WO | WO 2012-138495 | 10/2012 |
| WO | WO 2013-142084 | 9/2013 |
| WO | WO 2013-158475 | 10/2013 |
| WO | WO 2014-081693 | 5/2014 |
| WO | WO 2014-093014 | 6/2014 |
| WO | WO 2015-050751 | 4/2015 |
| WO | WO 2015-050862 | 4/2015 |

* cited by examiner

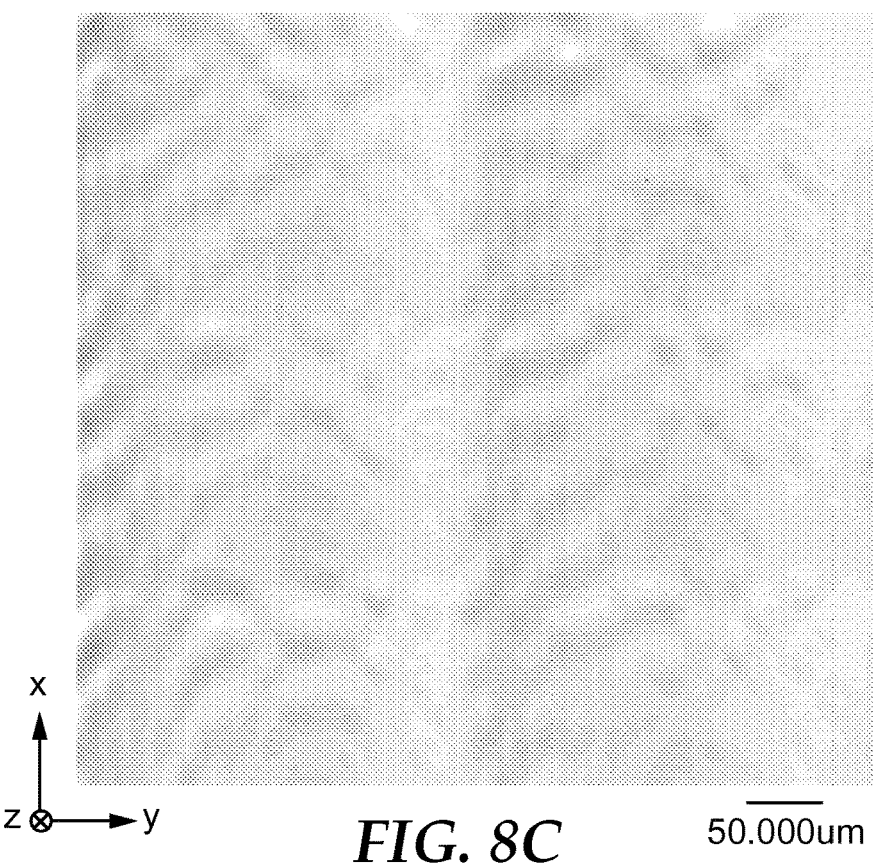
*FIG. 8C*  50.000um
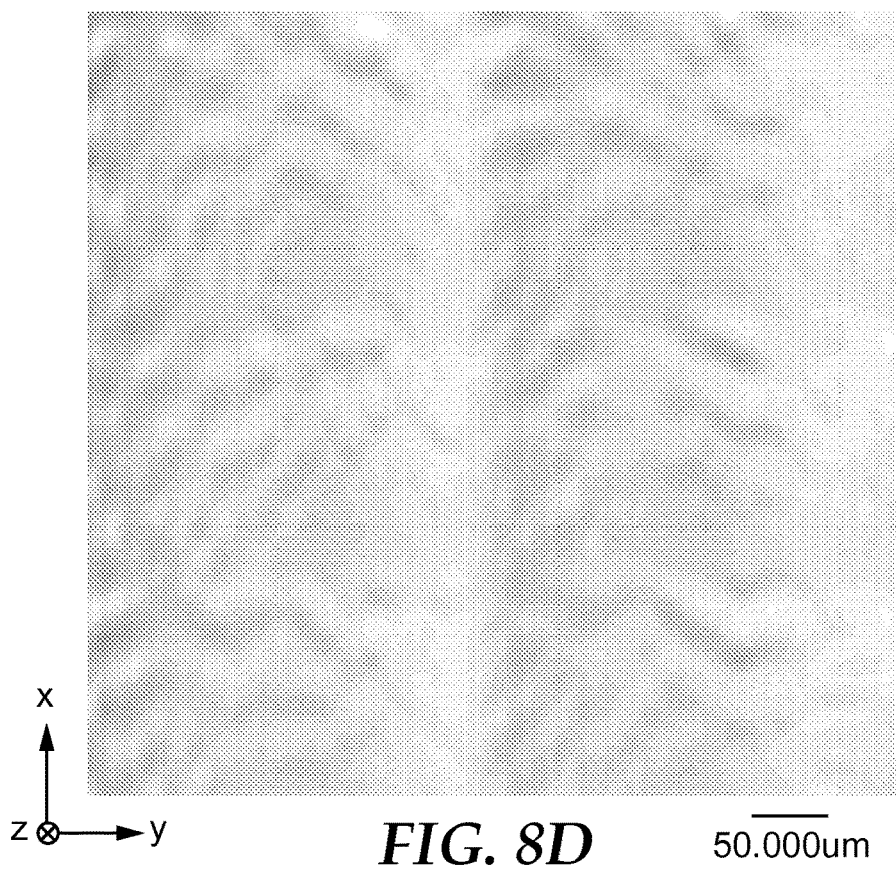
*FIG. 8D*  50.000um

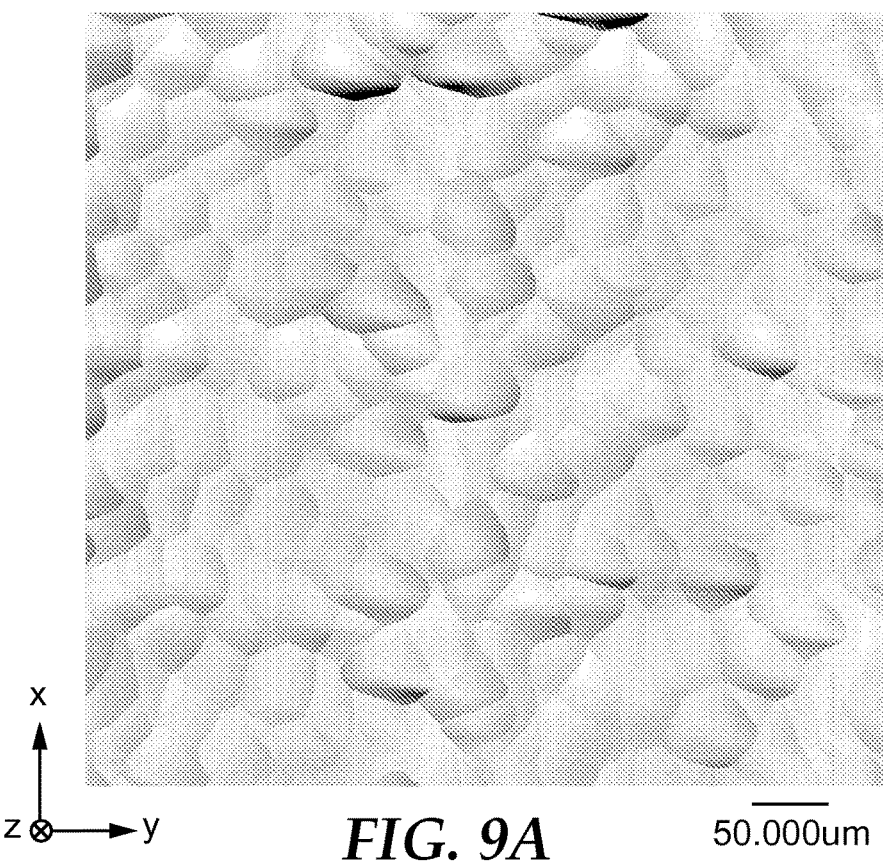
FIG. 9A  50.000um
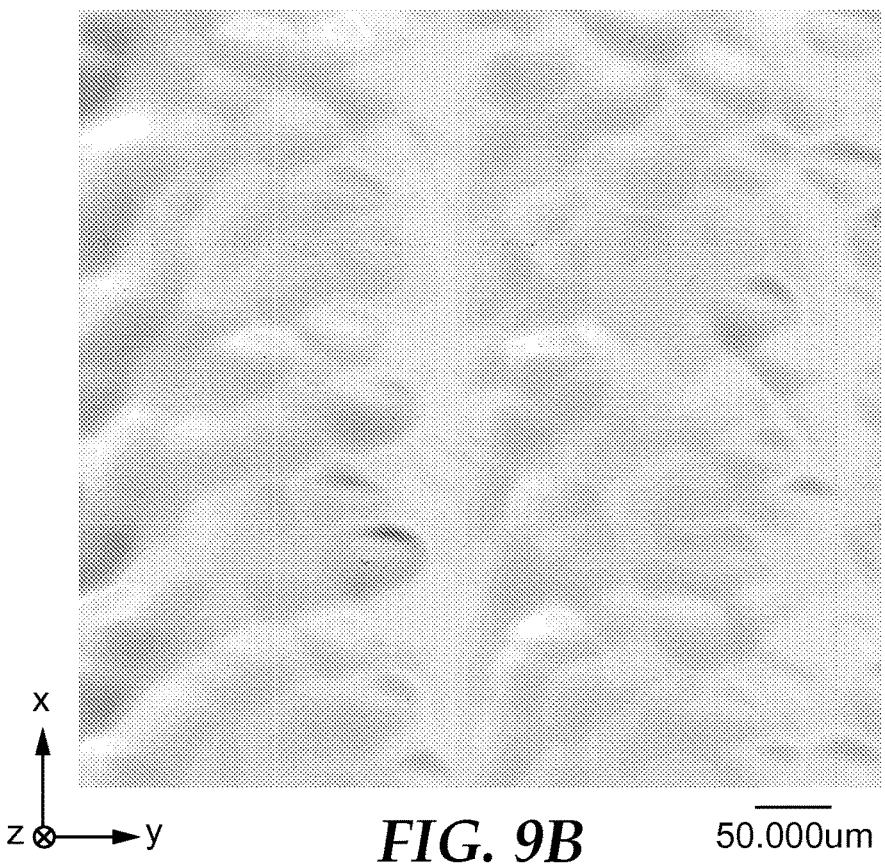
FIG. 9B  50.000um

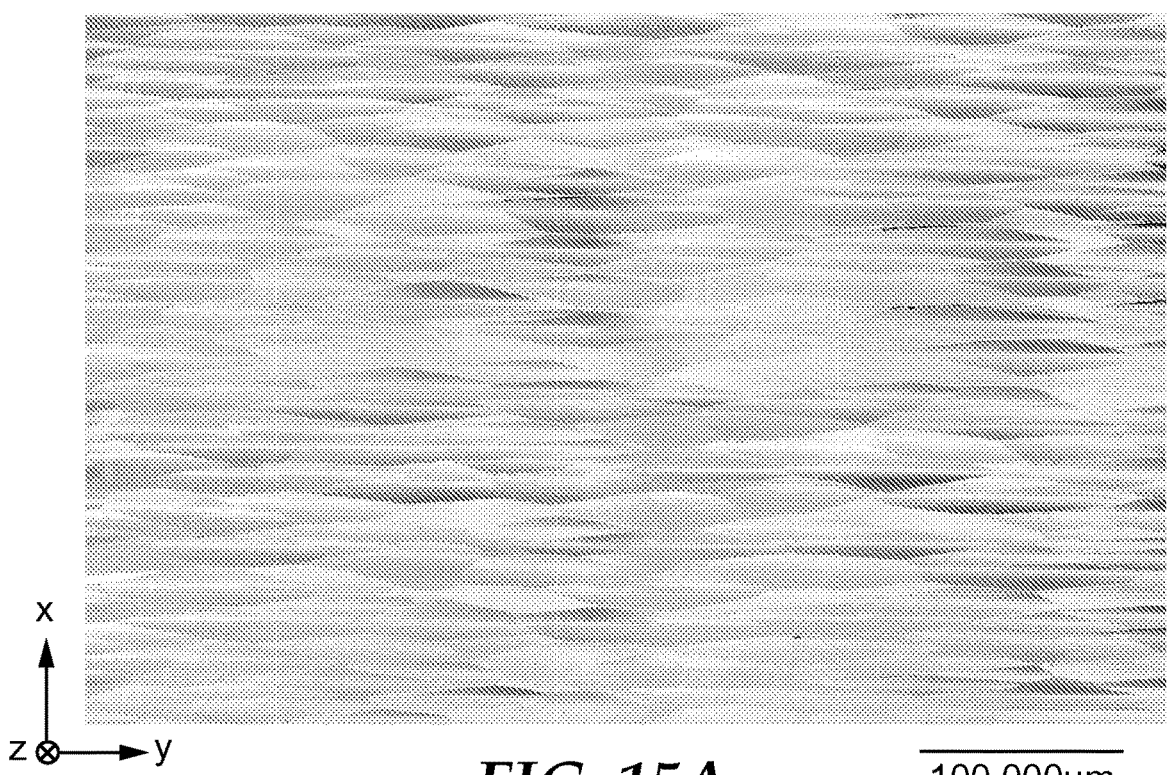
*FIG. 15A*  100.000um
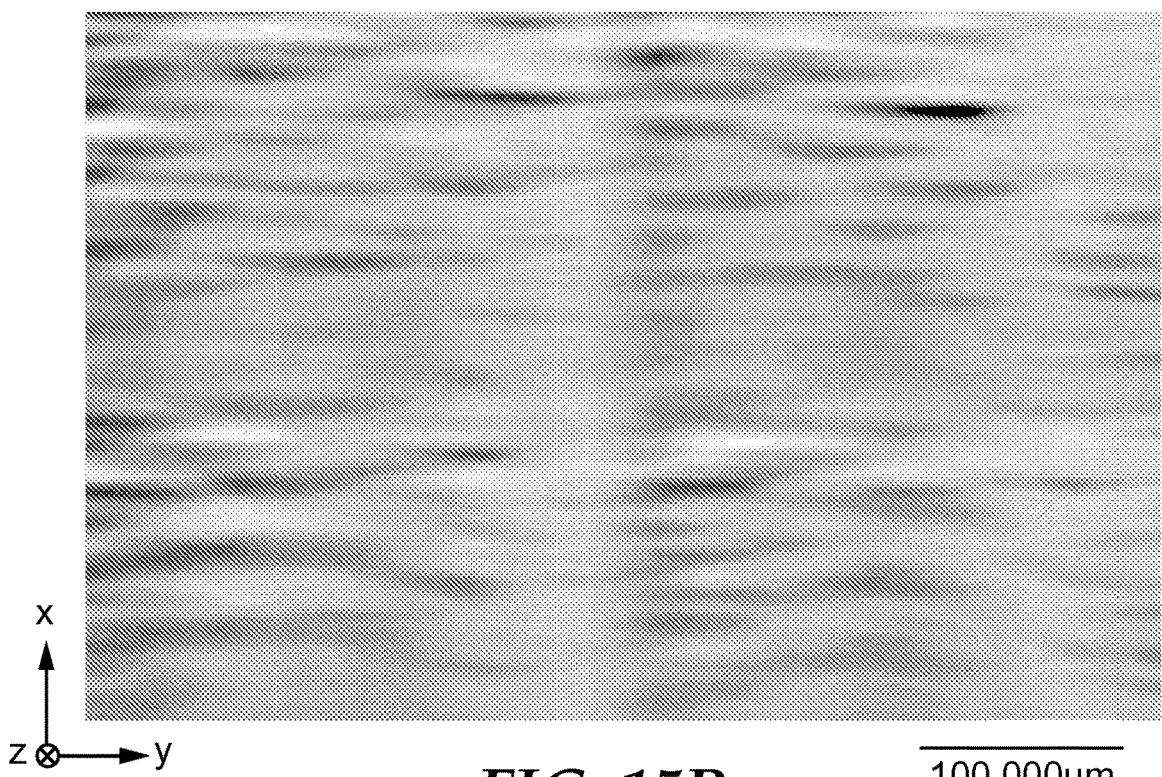
*FIG. 15B*  100.000um

MICROSTRUCTURED DIFFUSER COMPRISING FIRST MICROSTRUCTURED LAYER AND COATING, OPTICAL STACKS, AND METHOD

CROSS REFERENCE TO RELATED APPLICATIONS

This application is a national stage filing under 35 U.S.C. 371 of PCT/US2014/057082, filed Sep. 24, 2014, which claims the benefit of U.S. Provisional Application No. 61/885,723, filed Oct. 2, 2013, the disclosure of which is incorporated by reference in its/their entirety herein.

BACKGROUND

Various matte films (also described as antiglare films) and microstructured diffusers have been described.

For example, WO 2012/138496 describes an optical adhesive composition utilized to bond a stack of prism films. In one embodiment, the adhesive composition contains polymeric beads. The presence of such beads in the adhesive layer provides texture to the surface of the adhesive layer that diffuses light.

There are several approaches for obtaining matte films.

For example, a matte coating can be prepared by adding matte particles, such as described in U.S. Pat. No. 6,778,240.

In yet another approach, the surface of an antiglare film can be roughened or textured to provide a matte surface. According to U.S. Pat. No. 5,820,957; "the textured surface of the antireflective film may be imparted by any of numerous texturing materials, surfaces, or methods. Non-limiting examples of texturing materials or surfaces include: films or liners having a matte finish, microembossed films, a microreplicated tool containing a desirable texturing pattern or template, a sleeve or belt, rolls such as metal or rubber roll; or rubber-coated rolls."

WO2010/141345, WO2010/141261, and WO 2011/140018 describe antiglare and antireflective films fabricated using microreplication from a tool by casting and during a polymerizable resin in contact with a tool surface.

SUMMARY

In one embodiment, a microstructured diffuser is described comprising a light transmissive film comprising a first microstructured surface comprising a plurality of peaks and valleys. A coating is disposed on the first microstructured surface. The coating partially fills the valleys forming a second microstructured surface that substantially differs from the first microstructured surface.

The first and second microstructured surface can each be characterized by at least one optical property such as haze or clarity; or at least one physical property, such as the complement cumulative slope magnitude, surface roughness (e.g. Ra, Rz) or mean height. The difference in one or more optical and/or physical property between the first and second microstructured surfaces has an absolute value of at least 10%.

In another embodiment, a microstructured diffuser is described comprising a light transmissive film comprising a first microstructured surface comprising a plurality of peaks and valleys. A coating is disposed on the first microstructured surface wherein the coating partially fills the valleys forming a second microstructured surface having an Rz ranging from 1.5 microns to 7.5 microns. The peaks are free of embedded matte particles.

In another embodiment, a microstructured diffuser is described comprising a light transmissive film comprising a first microstructured surface comprising a plurality of peaks and valleys. A coating is disposed on the first microstructured surface wherein the coating partially fills the valleys forming a second microstructured surface. The second microstructured surface has a mean height ranging from 0.75 micron to 4 microns.

In another embodiment, a microstructured diffuser is described comprising a light transmissive film comprising a first microstructured surface comprising a plurality of peaks and valleys. A coating is disposed on the first microstructured surface wherein the coating partially fills the valleys forming a second microstructured surface. The coating has an average thickness of at least 0.5 microns.

Also described are optical film stacks comprising the microstructured diffuser described herein and methods of making a microstructured article.

BRIEF DESCRIPTION OF DRAWINGS

FIGS. 8A-8D are optical microscopy images of various microstructured surfaces fabricated from an embodied tool surface;

FIGS. 9A-9D are optical microscopy images of various microstructured surfaces fabricated from another embodied tool surface;

FIGS. 15A-15B are optical microscopy images of various microstructured surfaces fabricated from another embodied tool surface;

DETAILED DESCRIPTION

Figure 1A:
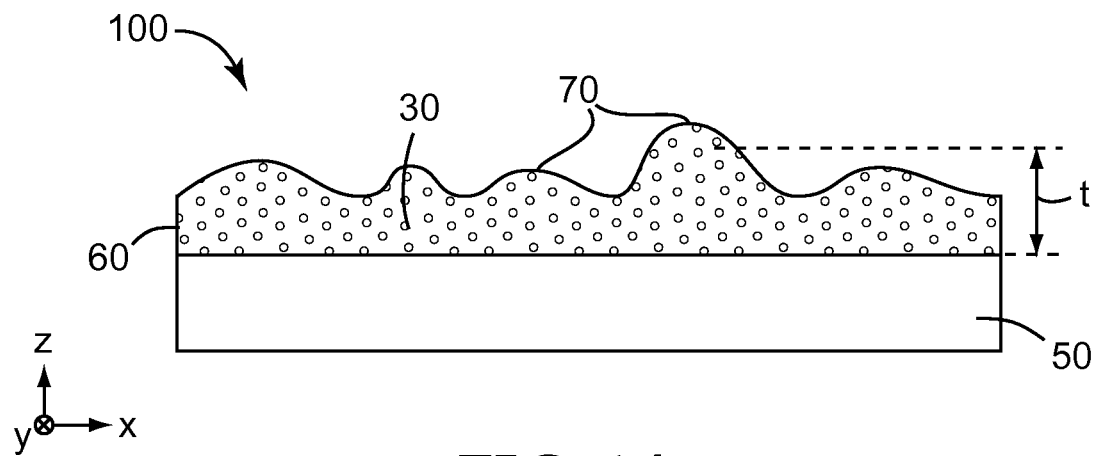
FIG. 1A is a schematic side-view of a first microstructured surface.
Figure 1B:
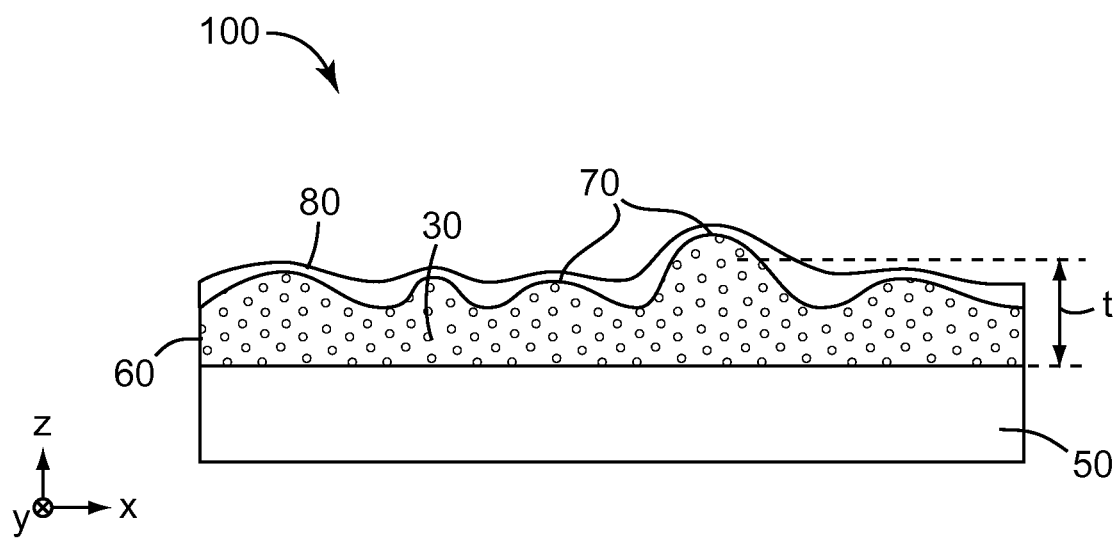
FIG. 1B is a schematic side-view of a first microstructured surface further comprising a coating forming a second microstructured surface.

Presently described are microstructured diffusers. In some embodiments, the microstructured diffusers may be suitable for use as antiglare films (also described as matte films.) With reference to FIG. 1A, the microstructured diffuser 100 comprises a first microstructured surface layer 60 typically disposed on a light transmissive (i.e. transparent) substrate 50. The first microstructured surface comprises a plurality of peaks (e.g. 70) and valleys. With reference to FIG. 1B, a coating 80 is disposed on the first microstructured surface. The coating partially fills the valleys forming a second microstructured surface.

The substrate 50, as well as the microstructured diffuser, generally have a transmission of at least 85%, or 90%, and in some embodiments at least 91%, 92%, 93%, or greater.

The transparent substrate may be a film. The (e.g. film) substrate thickness typically depends on the intended use. For most applications, the substrate thickness is preferably less than about 0.5 mm, and more preferably about 0.02 to about 0.2 mm. Alternatively, the transparent film substrate may be an optical (e.g. illuminated) display through which text, graphics, or other information may be displayed. The transparent substrate may comprise or consist of any of a wide variety of non-polymeric materials, such as glass, or various thermoplastic and crosslinked polymeric materials, such as polyethylene terephthalate (PET), (e.g. bisphenol A) polycarbonate, cellulose acetate, poly(methyl methacrylate), and polyolefins such as biaxially oriented polypropylene which are commonly used in various optical devices. The substrate can optionally be treated to improve adhesion e.g., chemical treatment (such as a primer), corona treatment such as air or nitrogen corona, plasma, flame, or actinic radiation.

The microstructured diffuser typically comprises a relatively thick microstructured surface layer. The microstructured layer typically has an average thickness ("t") of at least 0.5 microns, preferably at least 1 micron, and more preferably at least 2 or 3 microns. The microstructured layer typically has an average thickness of no greater than 15, 14, 13, 12, 11, or 10 microns.

Figure 2A:
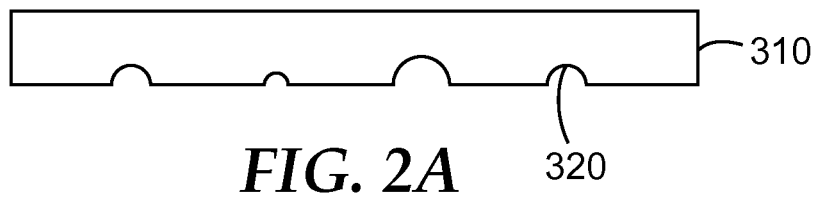
FIG. 2A is a schematic side-view of microstructure depressions.
Figure 2B:
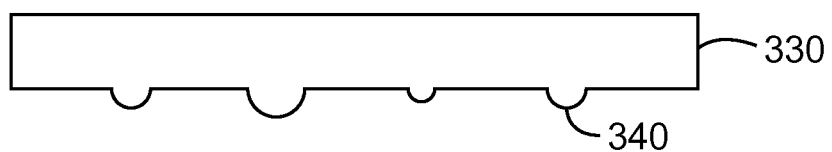
FIG. 2B is a schematic side-view of microstructure protrusions.

In some embodiments, the microstructures can be depressions, also referred to as valleys. For example, FIG. 2A is a schematic side-view of microstructured layer 310 that includes depressed microstructures 320 or microstructure cavities. The tool surface from which the microstructured surface is formed generally comprises a plurality of depressions. The microstructures of the microstructured diffuser are typically protrusions, also referred to as peaks. For example, FIG. 2B is a schematic side-view of a microstructured layer 330 including protruding microstructures 340. FIGS. 8A-9D and 15A-16B depicts various optical microscopy images of illustrative microstructured surfaces comprising a plurality of peaks and valleys surrounding the peaks.

Figure 3A:
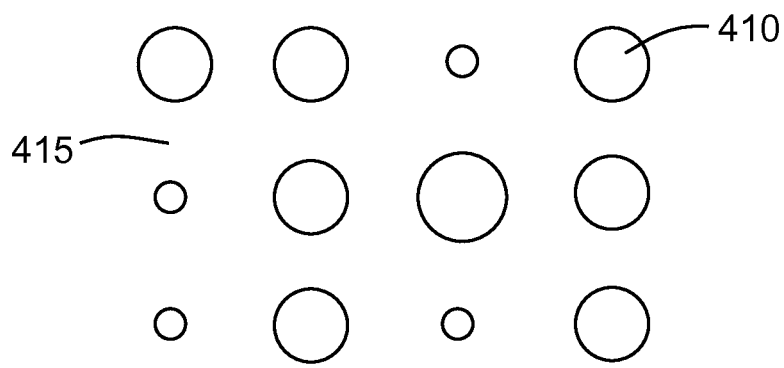
FIG. 3A is a schematic top-view of regularly arranged microstructures.
Figure 3B:
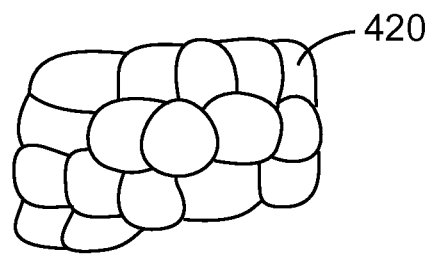
FIG. 3B is a schematic top-view of irregularly arranged microstructures.

In some embodiments, the microstructures can form a regular pattern. For example, FIG. 3A is a schematic top-view of microstructures 410 that form a regular pattern in a major surface 415. Typically however, the microstructures form an irregular pattern. For example, FIG. 3B is a schematic top-view of microstructures 420 that form an irregular pattern. In some cases, microstructures can form a pseudo-random pattern that appears to be random.

Figure 4:
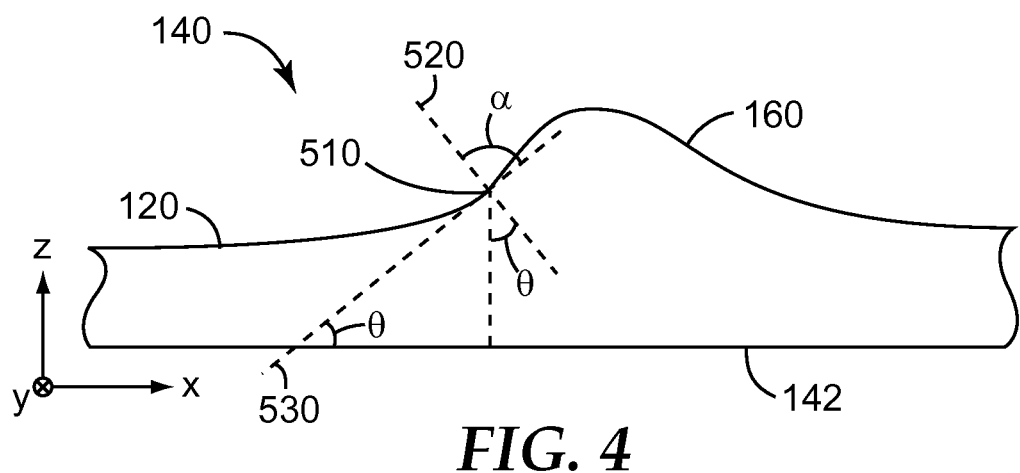
FIG. 4 is a schematic side-view of a microstructure.

A (e.g. discrete) microstructure can be characterized by slope. FIG. 4 is a schematic side-view of a portion of a microstructured layer 140. In particular, FIG. 4 shows a microstructure 160 in major surface 120 and facing major surface 142. Microstructure 160 has a slope distribution across the surface of the microstructure. For example, the microstructure has a slope θ at a location 510 where θ is the angle between normal line 520 which is perpendicular to the microstructure surface at location 510 ($\alpha$=90 degrees) and a tangent line 530 which is tangent to the microstructure surface at the same location. Slope θ is also the angle between tangent line 530 and major surface 142 of the microstructured layer.

In some embodiments, the peak microstructures are substantially free of (e.g. inorganic oxide or polymeric) matte particles. However, even in the absence of matte particles, the microstructures 70 may comprise (e.g. zirconia or silica) nanoparticles 30, as depicted in FIG. 1.

The size of the nanoparticles is chosen to avoid significant visible light scattering. It may be desirable to employ a mixture of inorganic oxide particle types to optimize an optical or material property and to lower total composition cost. The surface modified colloidal nanoparticles can be inorganic oxide particles having a (e.g. unassociated) primary particle size or associated particle size of at least 1 nm or 5 nm. The primary or associated particle size is generally less than 100 nm, 75 nm, or 50 nm. Typically the primary or associated particle size is less than 40 nm, 30 nm, or 20 nm. It is preferred that the nanoparticles are unassociated. Their measurements can be based on transmission electron microscopy (TEM). Surface modified colloidal nanoparticles can be substantially fully condensed.

Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

Due to the substantially smaller size of nanoparticles, such nanoparticles do not form a microstructure. Rather, the microstructures comprise a plurality of nanoparticles.

In other embodiments, a portion of the microstructures may comprise embedded matte particles.

Matte particles typically have an average size that is greater than about 0.25 microns (250 nanometers), or greater than about 0.5 microns, or greater than about 0.75 microns, or greater than about 1 micron, or greater than about 1.25 microns, or greater than about 1.5 microns, or greater than about 1.75 microns, or greater than about 2 microns. Smaller matte particles are typical for matte films that comprise a relatively thin microstructured layer. However, for embodiments wherein the microstructured layer is thicker, the matte particles may have an average size up to 5 microns or 10 microns. The concentration of matte particles may range from at least 1 or 2 wt-% to about 5, 6, 7, 8, 9, or 10 wt-% or greater.

Figure 5:
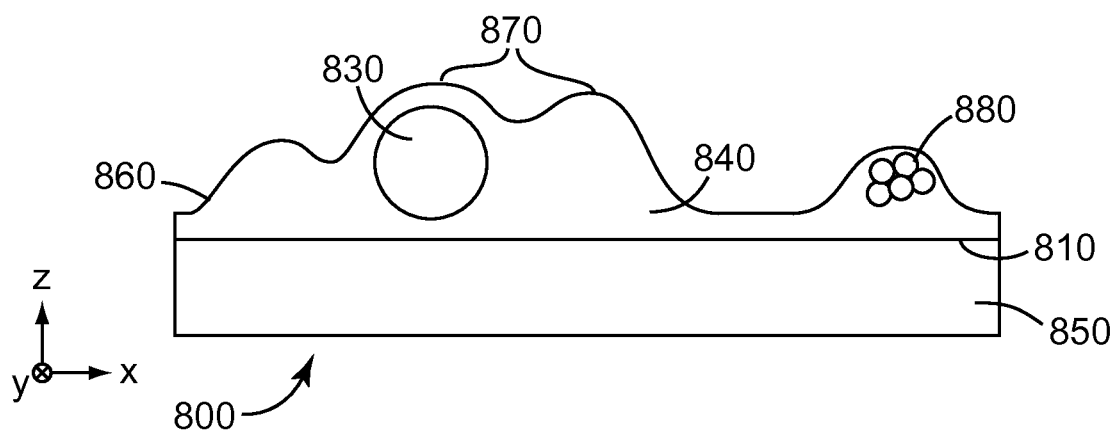
FIG. 5 is a schematic side-view of an optical film comprising a portion of microstructures comprising embedded matte particles.

FIG. 5 is a schematic side-view of an optical film 800 that includes a microstructured layer 860 disposed on a substrate 850. Microstructured layer 860 includes a first major surface 810 attached to substrate 850 and a plurality of matte particles 830 and/or matte particle agglomerates dispersed in a polymerized binder 840. In some favored embodiments, a substantial portion, such as at least about 50%, or at least about 60%, or at least about 70%, or at least about 80%, or at least about 90%, of microstructures 870 lack the presence of a matte particle 830 or matte particle agglomerate 880. Thus, no greater than 50%, 40%, 30%, 20% 10% of the peaks comprise embedded matte particles. It is surmised that the presence of (e.g. silica or $CaCO_3$) matte particles may provide improved durability even when the presence of such matte particles is insufficient to provide the desired clarity, and haze properties as will subsequently be described. However, due to the relatively large size of matte particles, it can be difficult to maintain matte particles uniformly dispersed in a coating composition. This can cause variations in the concentration of matte particles applied (particularly in the case of web coating), which in turn causes variations in the (e.g. optical) properties. In some embodiments, substantially all the peaks of the microstructured surface are free of (e.g. embedded) matte particles.

For embodiments wherein at least a portion of the microstructures comprise an embedded matte particle or agglomerated matte particle, the average size of the matte particles is typically sufficiently less than the average size of microstructures (e.g. by at least a factor of about 2 or more) such that the matte particle is surrounded by the polymerizable resin composition of the microstructured layer as depicted in FIG. 5.

When the microstructured layer includes embedded matte particles, the microstructured layer typically has an average thickness "t" that is greater than the average size of the particles by at least about 0.5 microns, or at least about 1 micron, or at least about 1.5 microns, or at least about 2 microns, or at least about 2.5 microns, or at least about 3 microns.

The first microstructured surface can be made using any suitable fabrication method. The microstructures are generally fabricated by casting and curing a polymerizable resin composition in contact with a tool surface such as described in U.S. Pat. No. 5,175,030 (Lu et al.) and U.S. Pat. No. 5,183,597 (Lu). The tool may be fabricated using any available fabrication method, such as by using engraving or diamond turning. Exemplary diamond turning systems and methods can include and utilize a fast tool servo (FTS) as described in, for example, PCT Published Application No. WO 00/48037, and U.S. Pat. Nos. 7,350,442 and 7,328,638, the disclosures of which are incorporated by reference thereto.

Figure 6:
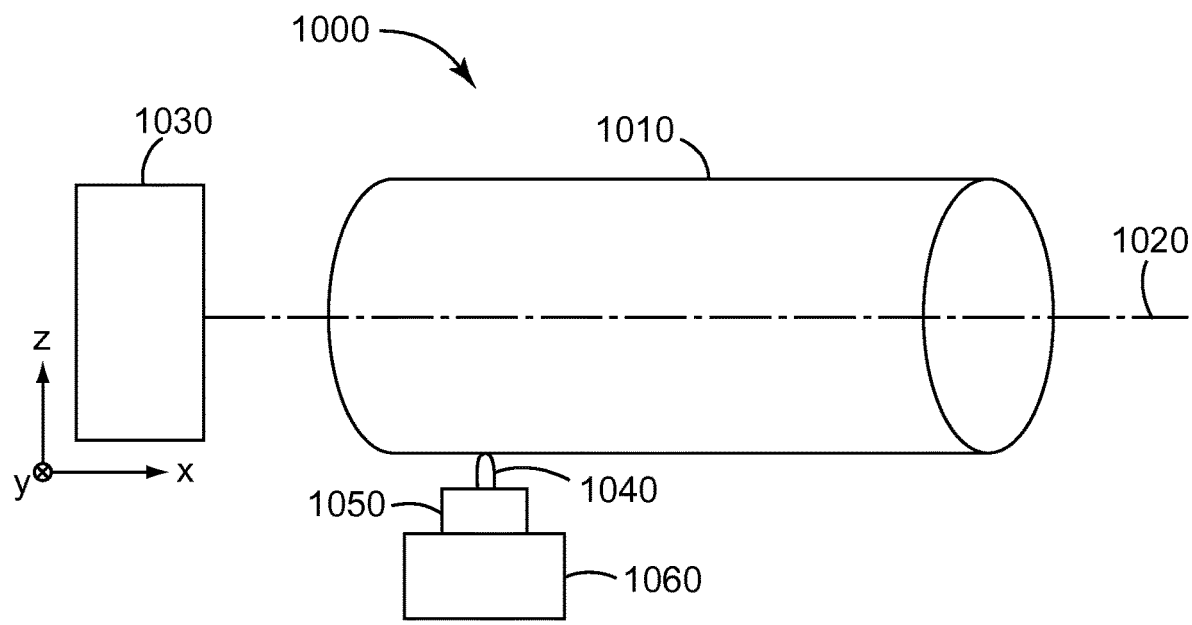
FIG. 6 is a schematic side-view of a cutting tool system.

FIG. 6 is a schematic side-view of a cutting tool system 1000 that can be used to cut a tool which can be microreplicated to produce the first microstructured surface 60. Cutting tool system 1000 employs a thread cut lathe turning process and includes a roll 1010 that can rotate around and/or move along a central axis 1020 by a driver 1030, and a cutter 1040 for cutting the roll material. The cutter is mounted on a servo 1050 and can be moved into and/or along the roll along the x-direction by a driver 1060. In general, cutter 1040 can be mounted normal to the roll and central axis 1020 and is driven into the engraveable material of roll 1010 while the roll is rotating around the central axis. The cutter is then driven parallel to the central axis to produce a thread cut. Cutter 1040 can be simultaneously actuated at high frequencies and low displacements to produce features in the roll that when microreplicated result in microstructures.

Servo 1050 is a fast tool servo (FTS) and includes a solid state piezoelectric (PZT) device, often referred to as a PZT stack, which rapidly adjusts the position of cutter 1040. FTS 1050 allows for highly precise and high speed movement of cutter 1040 in the x-, y- and/or z-directions, or in an off-axis direction. Servo 1050 can be any high quality displacement servo capable of producing controlled movement with respect to a rest position. In some cases, servo 1050 can reliably and repeatably provide displacements in a range from 0 to about 20 microns with about 0.1 micron or better resolution.

Driver 1060 can move cutter 1040 along the x-direction parallel to central axis 1020. In some cases, the displacement resolution of driver 1060 is better than about 0.1 microns, or better than about 0.01 microns. Rotary movements produced by driver 1030 are synchronized with translational movements produced by driver 1060 to accurately control the resulting shapes of microstructures.

The engraveable material of roll 1010 can be any material that is capable of being engraved by cutter 1040. Exemplary roll materials include metals such as copper, various polymers, and various glass materials.

Figure 7A:
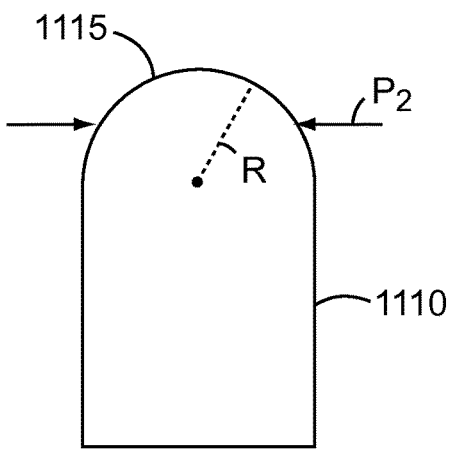
FIGS. 7A-7D are schematic side-views of various cutters.

Cutter 1040 can be any type of cutter and can have any shape that may be desirable in an application. For example, FIG. 7A is a schematic side-view of a cutter 1110 that has an arc-shape cutting tip 1115 with a radius "R". In some cases, the radius R of cutting tip 1115 is at least about 100 microns, or at least about 150 microns, or at least about 200 microns. In some embodiments, the radius R of the cutting tip is or at least about 300 microns, or at least about 400 microns, or at least about 500 microns, or at least about 1000 microns, or at least about 1500 microns, or at least about 2000 microns, or at least about 2500 microns, or at least about 3000 microns.

Figure 7B:
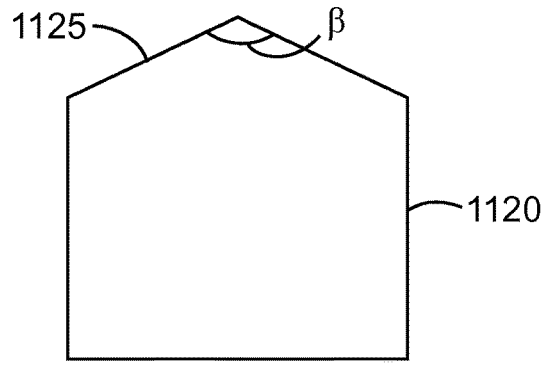
Figure 7C:
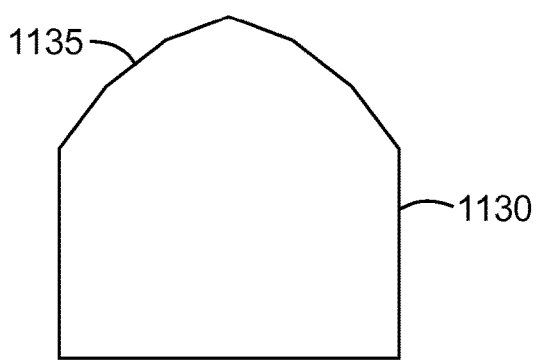
Figure 7D:
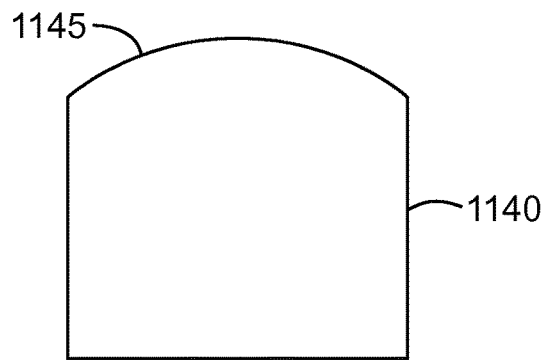

Alternatively, the microstructured surface of the tool can be formed using a cutter 1120 that has a V-shape cutting tip 1125, as depicted in FIG. 7B, a cutter 1130 that has a piece-wise linear cutting tip 1135, as depicted in FIG. 7C, or a cutter 1140 that has a curved cutting tip 1145, as depicted in 7D. In one embodiment, a V-shape cutting tip having an apex angle β of at least about 178 degrees or greater was employed.

Referring back to FIG. 6, the rotation of roll 1010 along central axis 1020 and the movement of cutter 1040 along the x-direction while cutting the roll material define a thread path around the roll that has a pitch $P_1$ along the central axis. As the cutter moves along a direction normal to the roll surface to cut the roll material, the width of the material cut by the cutter changes as the cutter moves or plunges in and out. Referring to, for example FIG. 7A, the maximum penetration depth by the cutter corresponds to a maximum width $P_2$ cut by the cutter. In general, the ratio $P_2/P_1$ is in a range from about 2 to about 4.

Alternatively, the tool may be fabricated by electrodeposition. In one embodiment, the tool is prepared by forming a first layer of a metal by electrodepositing the metal using a first electroplating process resulting in a first major surface of the first layer having a first average roughness; and forming a second layer of the metal on the first major surface of the first layer by electrodepositing the metal on the first major surface using a second electroplating process resulting in a second major surface of the second layer having a second average roughness smaller than the first average roughness; as described in WO2014/081693; incorporated herein by reference.

Several microstructured diffusers were made by microreplicating the surface of four different tools. Since the microstructured surface was a precise replication of the tool surface, the forthcoming description of the microstructured surface layer is also a description of the inverse tool surface.

FIGS. 8A, 9A, 15A, and 16A depict confocal scanning laser microscopy images (50× objective) of first microstructured surfaces generated from four different tools (i.e. Tool 1-Tool 4 respectively).

Figure 8A:
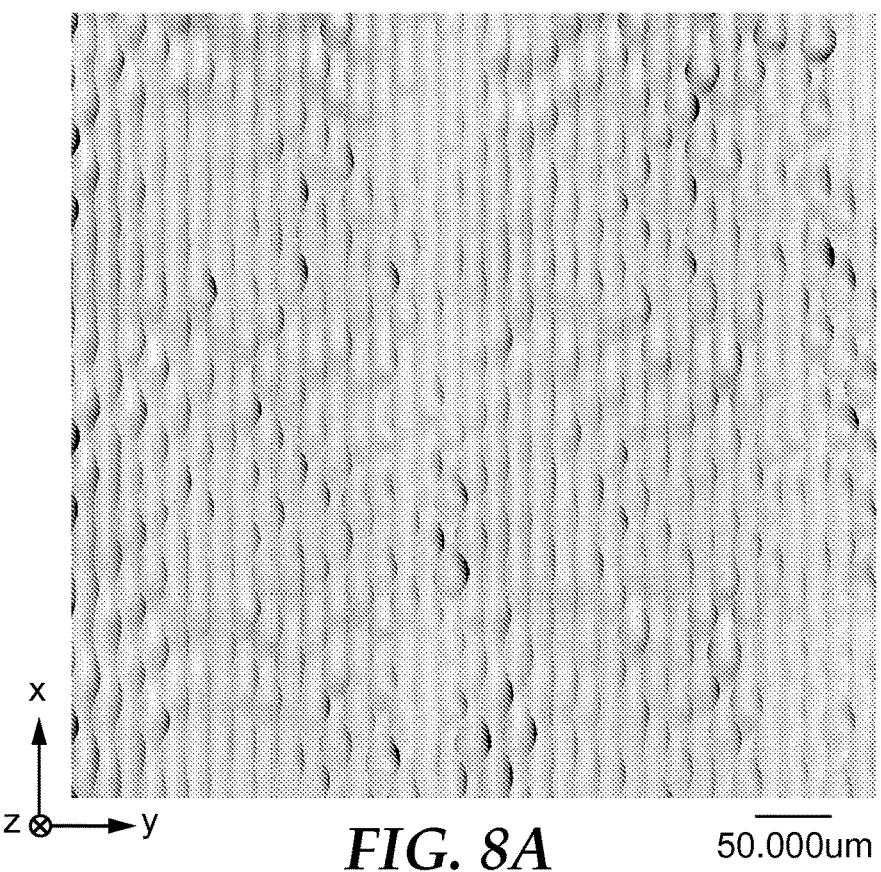
Figure 8B:
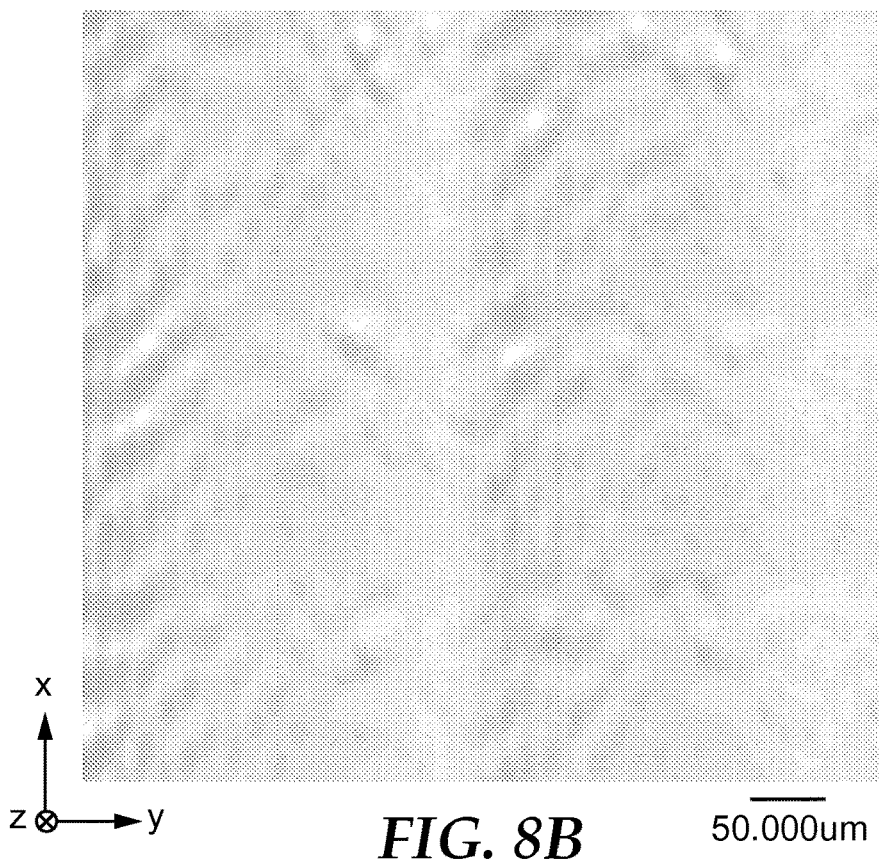
Figure 9C:
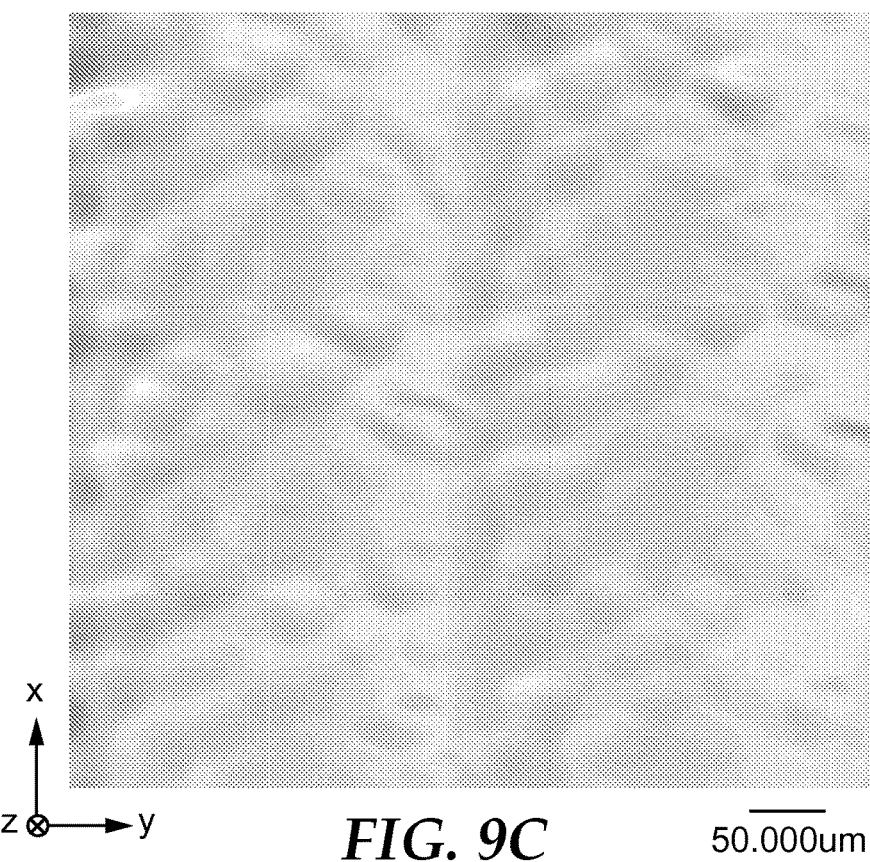
Figure 9D:
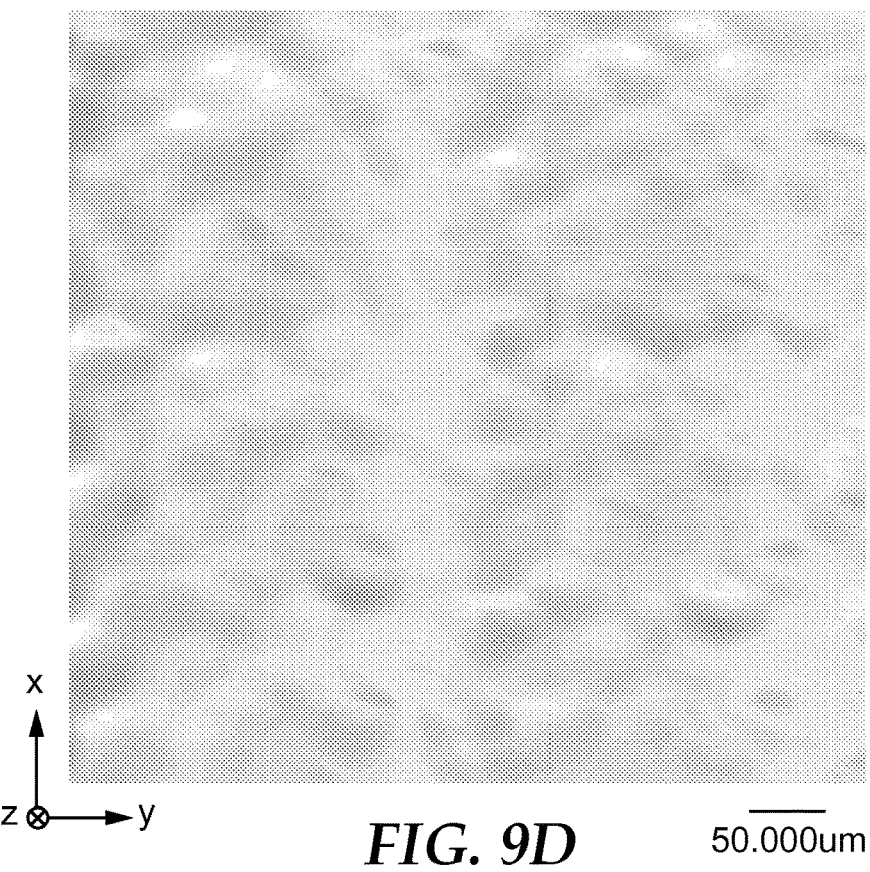
Figure 16A:
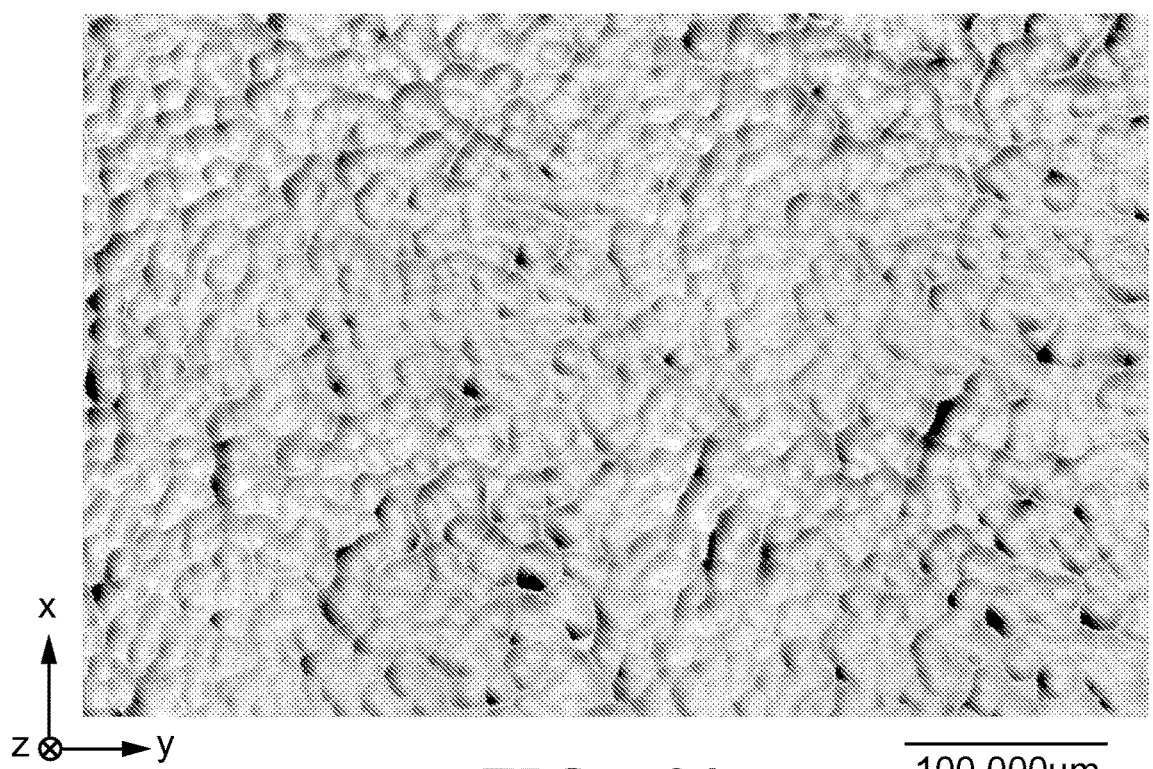
FIGS. 16A-16B are optical microscopy images of various microstructured surfaces fabricated from another embodied tool surface.
Figure 16B:
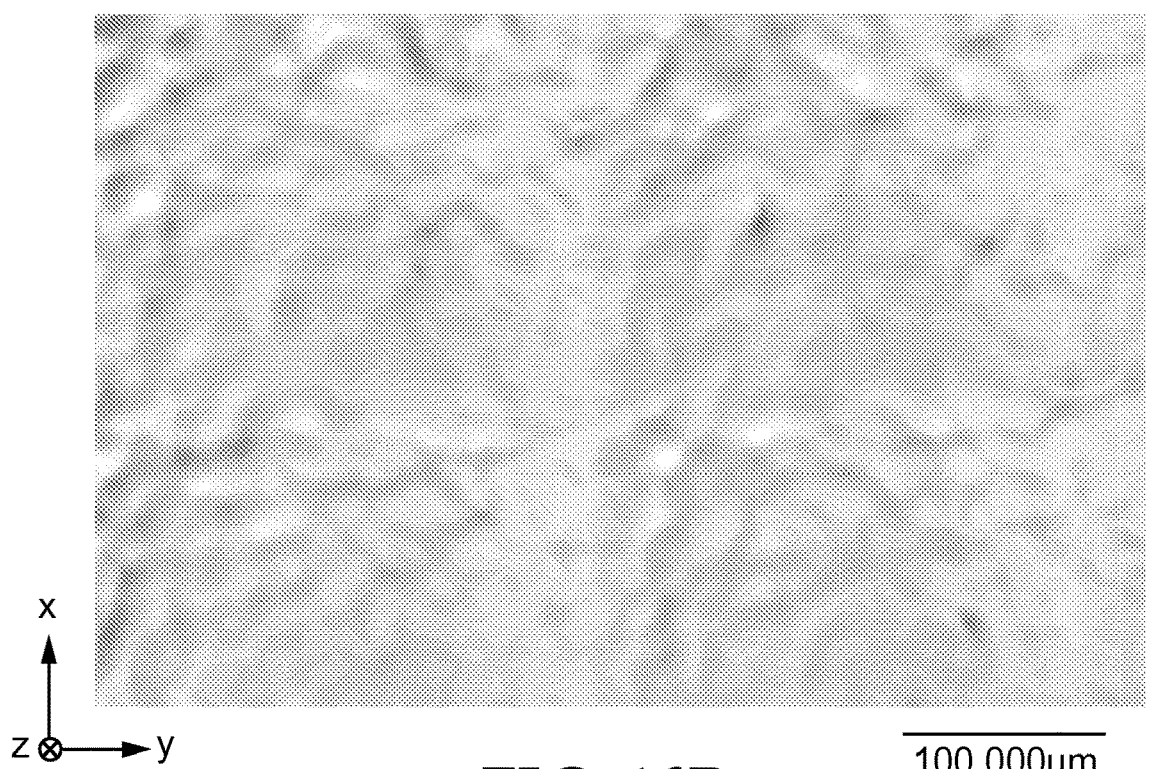

The substrate with the first microstructured surface is suitable as an intermediate article for fabricating a microstructured (e.g. diffuser) article by disposing a coating on the first microstructured surface. For example, FIGS. 8B-8D depict the first microstructured surface of FIG. 8A (formed from Tool 1) having various thicknesses of a coating disposed of the first microstructured surface. FIGS. 9B-9D depict the first microstructured surface of FIG. 9A (formed from Tool 2) having various thicknesses of a coating disposed of the first microstructured surface. FIG. 15B depicts the first microstructured surface of FIG. 15A (formed from Tool 3) having a (e.g. 3.3 micron) coating disposed on the first microstructured surface. FIG. 16B depicts the first microstructured surface of FIG. 16A (formed from Tool 3) having a (e.g. 3.3 micron) coating disposed on the first microstructured surface.

In typical embodiments, the coating covers the peaks and partially fills the valleys. However, when the coating is sufficiently low in viscosity, the coating may partially fill the valleys while covering only a portion of the peaks. For example, the tallest peaks of the first microstructured surface may not be covered by the coating. This partial filling of the valleys forms a second microstructured surface, also having a plurality of peaks and valleys, formed from the topography of the first microstructured surface together with the coating.

The thickness of the coating can vary depending on the first microstructured surface and the final properties that are desired. The thickness of the coating is generally greater than an optical thickness of ¼ wave. As described in WO2011/140018, when the coating has an optical thickness of ¼ wave, the coating generally uniformly conforms to the underlying first microstructured surface such that a substantial change in physical and optical properties is not obtained. The average thickness of the (i.e. dried) coating is typically at least 0.5, 0.6, 0.7, 0.8, 0.9, or 1 micron. In some embodiments, the average thickness of the (i.e. dried) coating is at least 1.5, 2, 2.5, 3, 3.5, 4, 4.5, or 5 microns. In typical embodiments, the thickness of the coating is no greater than about 20, 15, or 10 microns.

The first and second microstructured surface can each be characterized by at least one optical or physical property. When the difference in optical or physical property between the first and second microstructured surfaces has an absolute value of at least 10%, the second microstructured surface can be considered to substantially differ from the first microstructured surface. In some embodiments, the physical property may be the complement cumulative slope magnitude distribution of the microstructures (i.e. Fcc), surface roughness, or mean peak height. In other embodiments, the optical property may be haze or clarity. In some embodiments, the difference in optical or physical property between the first and second microstructured surfaces has an absolute value of at least 15% or 20% or greater.

Representative portions of the first microstructured surfaces and second microstructured surfaces, further comprising a coating disposed on the first microstructured surface, were characterized using confocal scanning laser microscopy (50× objective).

$F_{cc}(\theta)$ is the complement cumulative distribution of the slope magnitude and is defined by the following equation, wherein $N_G(q)$ is the number of pixels in the qth angle bin, where each angle bin has a size of 0.01°

$$F_{CC}(\theta) = \frac{\sum_{q=0}^{\infty} N_G(q)}{\sum_{q=0}^{\infty} N_G(q)}.$$

$F_{cc}$ at a particular angle ($\theta$) is the fraction of the slopes in which the absolute value is greater than a specified angle $\theta$. The fractions can also be expressed as a percentage of the total. For example, the fraction 1.0 is 100% and the fraction of 0.45 is 45%.

Figure 10:
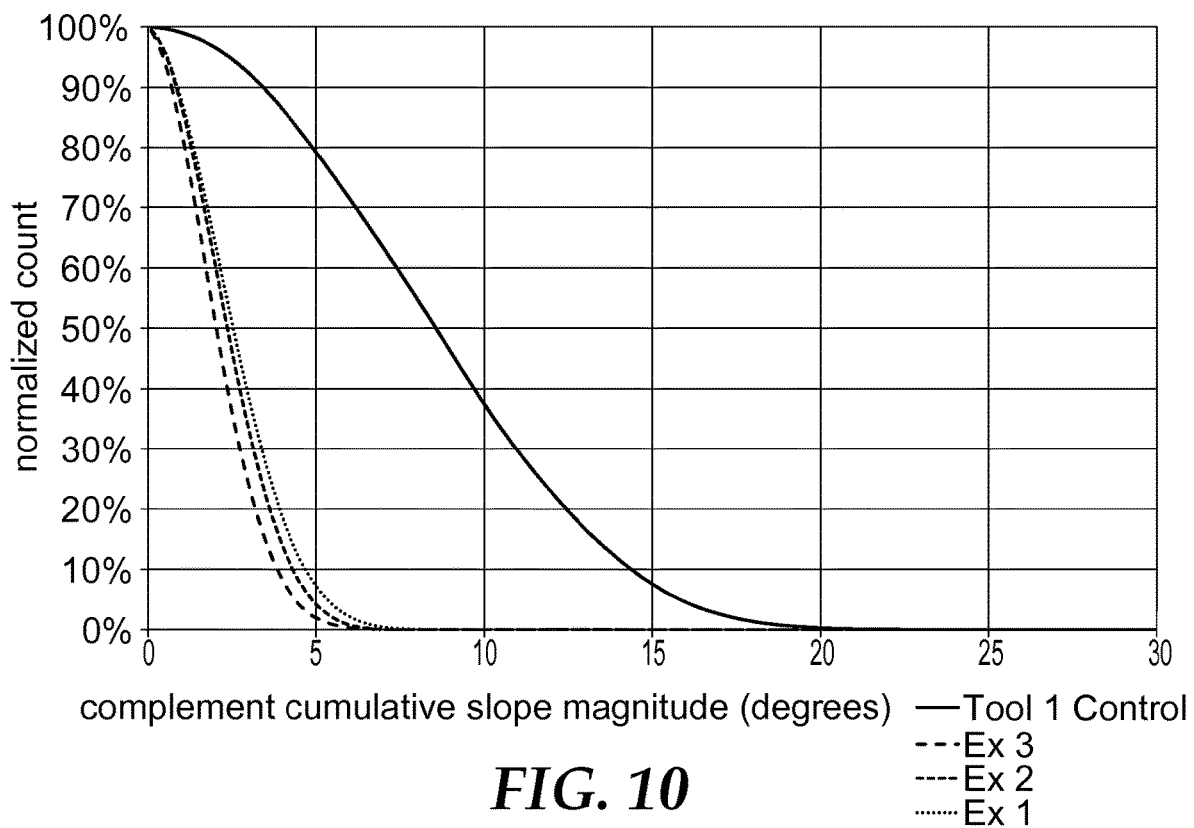
FIG. 10 is a graph of the complement cumulative slope magnitude distribution of the microstructured surfaces of 8A-8D.
Figure 11:
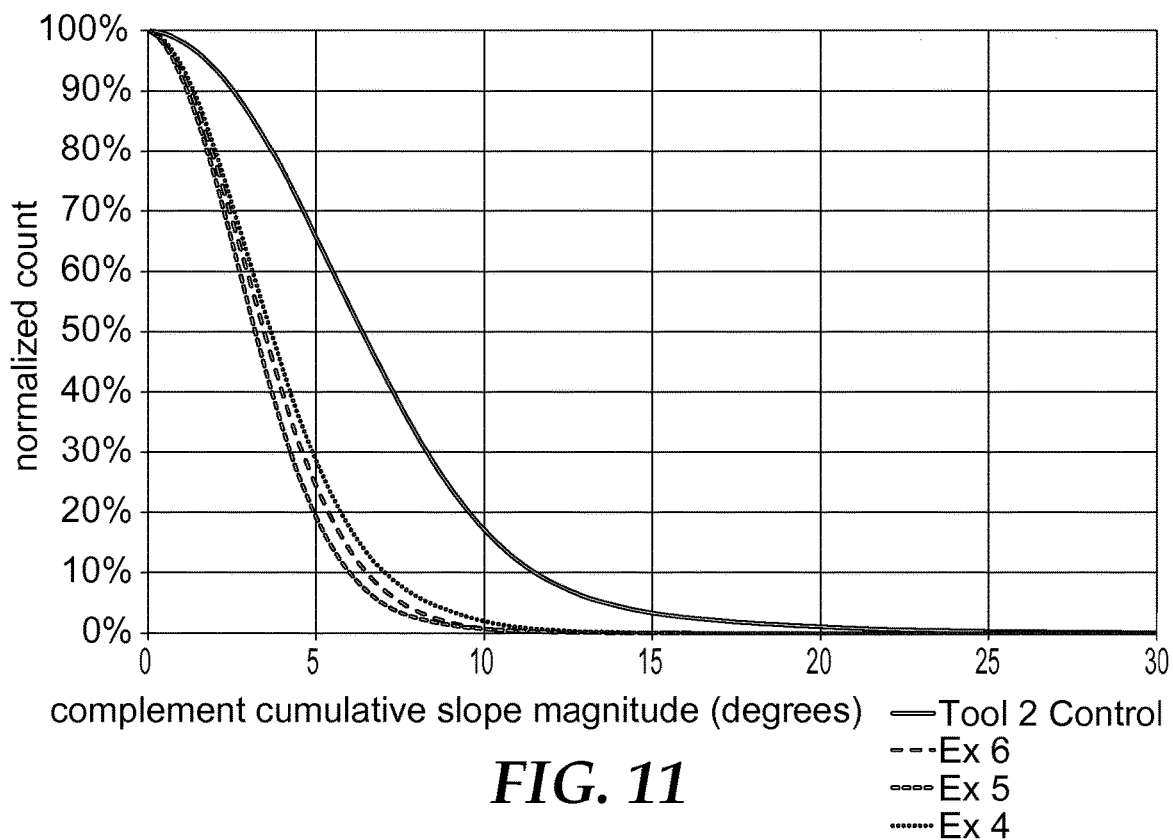
FIG. 11 is a graph of the complement cumulative slope magnitude distribution of the microstructured surfaces of 9A-9D.
Figure 17:
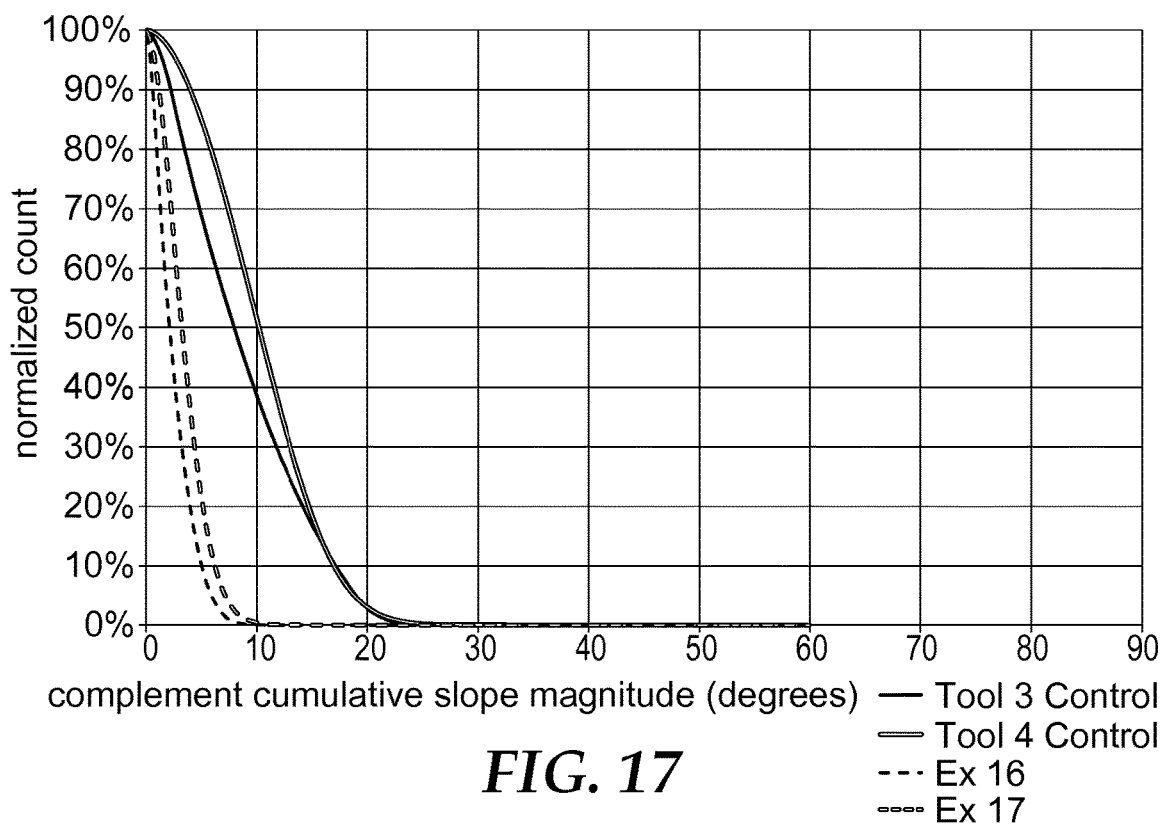
FIG. 17 is a graph of the complement cumulative slope magnitude distribution of the microstructured surfaces of 15A, 15B, 16A, and 16B.

The $F_{cc}(\theta)$ of various illustrative first and second microstructured layers is depicted in FIGS. 10, 11, and 17 and set forth in the following Tables A-D. In each of Tables A-D, the values in parentheses are the difference between the first microstructured surface (i.e. the control) and the second microstructured surface.

TABLE A

| | Tool 1 | | | | | | |
| --- | --- | --- | --- | --- | --- | --- | --- |
| | Coating Caliper (μm) | Fcc >0.1 | Fcc >0.3 | Fcc >0.7 | Fcc >1.3 | Fcc >2.1 | Fcc >4.1 |
| Control | None | 100 | 100 | 100 | 99 | 96 | 86 |
| Ex. 1 | 3 | 100 | 98 | 93 | 81 | 61 (35) | 17 (69) |
| Ex. 2 | 4 | 100 | 98 | 93 | 80 | 58 (38) | 13 (73) |
| Ex. 3 | 5 | 99 | 97 | 90 | 74 | 48 (48) | 7 (79) |

TABLE B

| | Tool 2 | | | | | | |
| --- | --- | --- | --- | --- | --- | --- | --- |
| | Coating Caliper (μm) | Fcc >0.1 | Fcc >0.3 | Fcc >0.7 | Fcc >1.3 | Fcc >2.1 | Fcc >4.1 |
| Control | None | 100 | 100 | 99 | 97 | 93 | 76 |
| Ex. 4 | 3 | 100 | 99 | 97 | 91 | 78 (15) | 42 (34) |
| Ex. 5 | 4 | 100 | 99 | 96 | 88 | 73 (20) | 32 (44) |
| Ex. 6 | 5 | 100 | 99 | 96 | 89 | 76 (17) | 38 (38) |

TABLE C

Asymmetric Tool 3

| | Coating Caliper (μm) | Fcc >0.1 | Fcc >0.3 | Fcc >0.7 | Fcc >1.3 | Fcc >2.1 | Fcc >4.1 | Ycc >2.1 | Xcc >2.1 | Ycc >4.1 | Xcc >4.1 |
|---|---|---|---|---|---|---|---|---|---|---|---|
| Control | None | 100 | 100 | 99 | 96 | 91 | 75 | 85 | 22 | 72 | 2 |
| Ex. 16 | 3.3 | 99 | 97 | 87 | 70 | 50 (41) | 18 (57) | 48 (37) | 0 (22) | 18 (54) | 0 (2) |

TABLE D

Symmetric Tool 4

| | Coating Caliper (μm) | Fcc >0.1 | Fcc >0.3 | Fcc >0.7 | Fcc >1.3 | Fcc >2.1 | Fcc >4.1 | Ycc >2.1 | Xcc >2.1 | Ycc >4.1 | Xcc >4.1 |
|---|---|---|---|---|---|---|---|---|---|---|---|
| Control | None | 100 | 100 | 100 | 99 | 97 | 89 | 81 | 80 | 64 | 63 |
| Ex. 17 | 3.3 | 100 | 99 | 96 | 88 | 73 (24) | 34 (55) | 45 (36) | 43 (37) | 16 (48) | 14 (49) |

With reference to the illustrative embodiments of Tables A-D, the complement cumulative slope magnitude distribution of the first microstructured surface at a slope magnitude of greater than 0.1 degrees, greater than 0.3 degrees, greater than 0.7 degrees and greater than 1.3 degrees can be at least 95, 96, 97, 98, 99, or 100%. The complement cumulative slope magnitude distribution of the second microstructured surface at a slope magnitude of greater than 0.1 degrees or greater than 0.3 degrees can also be at least 95, 96, 97, 98, 99, or 100%. In some embodiments, the complement cumulative slope magnitude distribution of the second microstructured surface at a slope magnitude of greater than 0.7 degrees can also be at least 95, 96, 97, 98, 99, or 100% or it can be slightly lower such as at least 85 or 90%. The complement cumulative slope magnitude distribution of the second microstructured surface at a slope magnitude of greater than 1.3 degrees can also be at least 65, 70, 75, 80, 85, or about 90%.

The difference in complement cumulative slope magnitude distribution between the first and second microstructured surfaces at a slope magnitude greater than 2.1 degrees or greater than 4.1 degrees is at least 10%, 11%, 12%, 13%, 14%, or 15%. Further in some embodiments, the difference in the complement cumulative slope magnitude distribution between the first and second microstructured surfaces at a slope magnitude greater than 2.1 degrees or greater than 4.1 degrees is at least 20%, 30%, 40%, 50%, 60%, or 70%.

The first microstructured surface can have a complement cumulative slope magnitude distribution at a slope magnitude greater 2.1 degrees of a least 90%, 91%, 92%, 93%, 94%, 95%, or 96%. However, and the second microstructured surface can have a complement cumulative slope magnitude distribution at a slope magnitude greater than 2.1 degrees of less than or equal to 80 and in some embodiments less than or equal to 75, 70, 65, 60, 55, 50, or 45%.

The first microstructured surface can have a complement cumulative slope magnitude distribution at a slope magnitude greater than 4.1 degrees of a least 60%, 65%, 70%, or 75%. However, the second microstructured surface can have a complement cumulative slope magnitude distribution at a slope magnitude greater than 4.1 degrees of less than or equal to 50, 45, 40, 35, 30, 25, 20, 15, or 10%.

With reference to the illustrative embodiments of FIGS. 10, 11, and 17, the first microstructured surface can have a complement cumulative slope magnitude distribution at a slope magnitude greater than 10 degrees of at least 10%, 20%, 30%, 40% or 50%. Further, the first microstructured surface can have a complement cumulative slope magnitude distribution at a slope magnitude greater than 15 degrees of at least 5%, 10%, 15%, or 20%. However, the second microstructured surface can have a complement cumulative slope magnitude distribution at a slope magnitude greater 10 degrees or greater than 15 degrees of less than 40%, 30% or 20% and in some embodiments less than 10%, 9%, 8%, 7%, 6%, 5%, 4%, 3%, 2%, 1% or 0. Further, the first microstructured surface can have a complement cumulative slope magnitude distribution at a slope magnitude greater than 5 degrees of at least 50%, 60%, 70%, 80% or 85%. However, the second microstructured surface can have a complement cumulative slope magnitude distribution at a slope magnitude greater than 5 degrees of less than 40% and in some embodiments less than 35%, 30%, 25%, 20% 15%, 10% or 5%.

Figure 18:
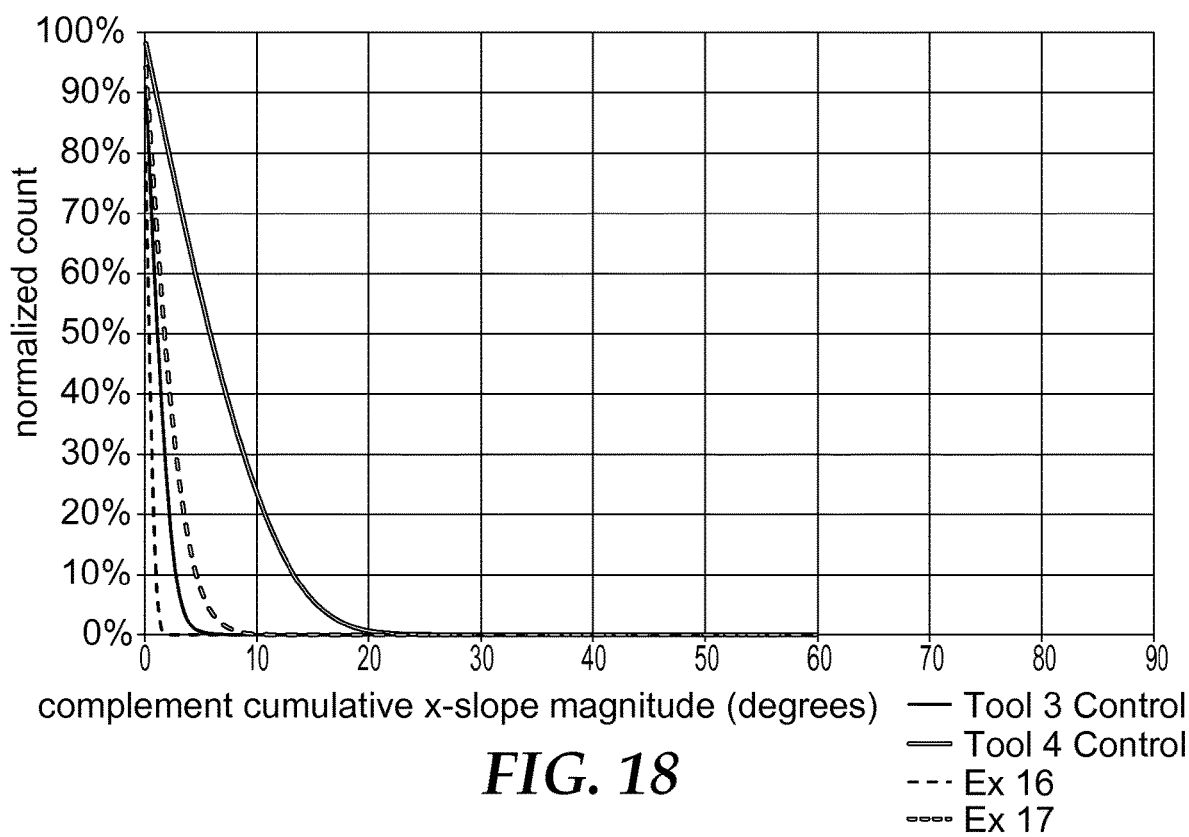
FIG. 18 is a graph of the complement cumulative x-slope slope magnitude distribution of the microstructured surfaces of 15A, 15B, 16A, and 16B.
Figure 19:
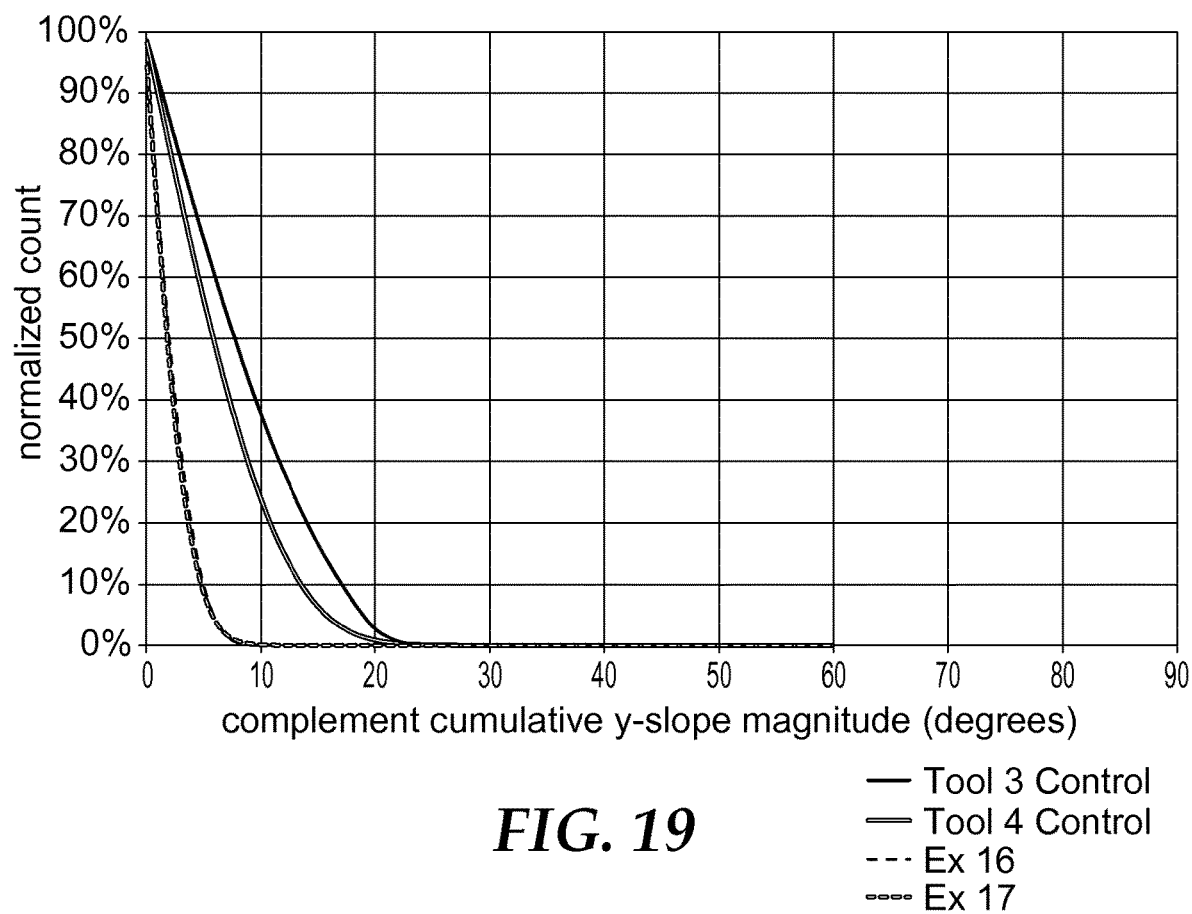
FIG. 19 is a graph of the complement cumulative y-slope slope magnitude distribution of the microstructured surfaces of 15A, 15B, 16A, and 16B.

The complement cumulative slope magnitude distribution can also be expressed with regard to the x-slope and y-slope magnitude distribution that are components of the total complement cumulative slope magnitude distribution. As used here, "complement cumulative slope magnitude distribution" refers to the total unless specified otherwise. When the microstructures of the microstructured surface are geometrically symmetric, the complement cumulative x-slope magnitude distribution is substantially the same as the complement cumulative y-slope magnitude distribution. With reference to the illustrative embodiments of FIGS. 18 and 19, the first microstructured surface prepared from illustrative Tool 4, is depicted as having the complement cumulative x-slope slope magnitude distribution (Xcc) substantially the same as the complement cumulative y-slope slope magnitude distribution (Ycc). In contrast, the first microstructured surface prepared from illustrative Tool 3 has asymmetric microstructures and thus the x-slope and y-slope distribution are different. For example, the Ycc of Tool 3 at greater than 5 degrees of illustrative Tool 3 is about 70%; whereas the Xcc is less than 10, 9, 8, 7, 6, or 5%. Further, the Ycc of Tool 3 at greater than 4.1 degrees for illustrative Tool 3 is greater than 70%; whereas the Xcc at greater than 4.1 degrees is less than 60, 50, 40, 30, 20, 10 or 5%.

The first and second microstructured surfaces can be characterized according to other physical properties including mean height and surface roughness (e.g. Ra, Rz). Ra is the average roughness calculated over the entire area measured; whereas Rz is the average maximum surface height of the ten largest peak-to-valley separations in the evaluation area. Ra and Rz of illustrative first and second microstructured layers is set forth in the following Tables E-H. In each of Tables E-H, the values in parenthesis are the difference between the first microstructured surface (i.e. the control) and the second microstructured surface and such difference expressed as a percentage (e.g. Rz (first)–Rz (second)/Rz (first)). Although Rz and mean height reported in Tables E-H was determined utilizing surface analysis techniques, Rz can also be determined from scanning electron microscopy of cross-sections of the coated first microstructured surface. When cross-sectional analysis is utilized a sufficient number of cross-sections are analyzed to obtain a statistically meaningful result that is representative of the entire first and second microstructured surfaces.

TABLE E

| Tool 1 | | | |
|---|---|---|---|
| Coating Caliper | Rz | Ra | Mean Height |
| Control (None) | 5.0 microns | 0.59 microns | 2.6 microns |
| Ex. 1 (3 μm) | 2.4 (2.6 microns, −52%) | 0.27 (0.32 microns, −54%) | 1.1 (1.5 microns, −58%) |
| Ex. 2 (4 μm) | 2.1 (2.9 microns, −42%) | 0.27 (0.32 microns, −54%) | 1.0 (1.6 microns, −61%) |
| Ex. 3 (5 μm) | 2.0 (3.0 microns, −60%) | 0.24 (0.35 microns (−59%) | 1.0 (1.6 microns, −61%) |

TABLE F

| Tool 2 | | | |
|---|---|---|---|
| Coating Caliper | Rz | Ra | Mean Height |
| Control (None) | 7.8 microns | 0.97 microns | 3.6 microns |
| Ex. 4 (3 μm) | 6.0 (1.8 microns, −23%) | 0.70 (0.27 microns, (−27%) | 2.6 (1.0 micron −27%) |
| Ex. 5 (4 μm) | 5.1 (2.7 microns, −35%) | 0.61 (0.36 microns, −37%) | 2.2 (1.4 microns, −39%) |
| Ex. 6 (5 μm) | 5.7 (2.1 microns −27%) | 0.72 (0.25 microns, −26%) | 2.8 (0.8 microns −23%) |

TABLE G

| Asymmetric Tool 3 | | | |
|---|---|---|---|
| Coating Caliper | Rz | Ra | Mean Height |
| Control (None) | 4.7 microns | 0.59 microns | 2.6 microns |
| Ex. 16 (3.3 μm) | 2.4 (2.3 microns, −51%) | 0.28 (0.31 microns −52%) | 1.3 (1.3 microns −50%) |

TABLE H

| Symmetric Tool 4 | | | |
|---|---|---|---|
| Coating Caliper | Rz RI 1.56 | Ra RI 1.56 | Mean Height |
| Control (None) | 7.1 microns | 0.75 | 2.9 microns |
| Ex. 17 (3.3 μm) | 3.6 (3.5 microns, −51%) | 0.40 (0.35 microns −47%) | 1.4 (1.5 microns, −52%) |

With reference to the illustrative embodiments of Tables E-H, the coating disposed on the first microstructured surface can reduce the Rz and/or Ra of the second microstructured surface by at least 10%. Further, in some embodiments, the difference in Rz and/or Ra between the first and second microstructured surfaces can be at least −20%, −30%, −40%, −50%, or −60%.

The Rz of the second microstructured surface is typically at least 1.3, 1.4 or 1.5 microns and no greater than about 5 microns; whereas the first microstructured surface has a greater Rz than the second microstructured surface. In some embodiments, the Rz of the second microstructured surface is at least 1.6, 1.7, 1.8, 1.9 or 2 microns. In some embodiments, the Rz of the first microstructured surface can be at least 4.5, 5.0, 5.5, 6.0, 6.5, 7.0, 7.5, 8.0, 8.5, 9.0, 9.5 or 10 microns. In some embodiment, the Rz of the second microstructured surface is no greater than 7.5, 7.0, 6.5, 6.0, 5.5, 5.0, or 4.5 microns. The Ra of the second microstructured surface is typically at least 0.15, 0.16, 0.17, 0.18, 0.19, or 0.20 micron and no greater than about 1 micron; whereas the first microstructured surface has a greater Ra than the second microstructured surface. In some embodiments, the Ra of the second microstructured surface is no greater than 0.95, 0.90, 0.85, 0.80, or 0.75.

With reference to the illustrative embodiments of Tables E-H, the coating disposed on the first microstructured surface can reduce the mean height of the second microstructured surface by at least 10%. Further, in some embodiments, the difference in mean height between the first and second microstructured surfaces can be at least −20%, −30%, −40%, −50%, or −60%.

The mean height of the second microstructured surface is typically at least 0.75, 0.80, 0.85, 0.90, 0.95, or 1.00 micron. In some embodiments, the mean height of the second microstructured surface is at least 1.5 or 2.0 microns. The mean height of the second microstructured surface is typically no greater than about 4 microns and in some embodiments, no greater than 3.5 or 3 microns. The first microstructured surface has a mean height greater than the second microstructured surface. In some embodiments, the mean height of the first microstructured surface is at least 2.5, 3, 3.5, 4, or 5 microns.

Haze and clarity of the first and second microstructured surfaces can be measured according to the test method described in the examples. The haze and clarity of various illustrative first and second microstructured layers is depicted in the following Tables I-J. In each of Tables I-J, the values in parenthesis are the difference between the first microstructured surface (i.e. the control) and the second microstructured surface. Although the complement cumulative slope magnitude distribution is not affected by the choice of polymerizable resin utilized for fabricating the first microstructured surface, the choice of polymerizable resin can affect the haze and clarity. Two different polymerizable resins were utilized to fabricate the first microstructured surface, one having a refractive index (RI) of 1.56 and the other having a refractive index of 1.65 as indicated in the following Table I-J.

TABLE I

Tool 1

| Coating Caliper | Haze RI 1.56 | Clarity RI 1.56 | Haze RI 1.65 | Clarity RI 1.65 |
|---|---|---|---|---|
| Control (None) | 72 | 6 | 90 | 6 |
| Ex. 1 (3 μm) | 16 (56) | 32 (−26) | 31 (59) | 19 (−13) |
| Ex. 2 (4 μm) | 11 (61) | 38 (−32) | 26 (64) | 22 (−16) |
| Ex. 3 (5 μm) | 9 (63) | 44 (−38) | 22 (68) | 26 (−20) |

TABLE J

Tool 2

| Adhesive Coating Caliper | Haze RI 1.56 | Clarity RI 1.56 | Haze RI 1.65 | Clarity RI 1.65 |
|---|---|---|---|---|
| Control (None) | 73 | 8 | 89 | 6 |
| Ex. 4 (3 μm) | 24 (49) | 21 (−13) | 35 (54) | 15 (−9) |
| Ex. 5 (4 μm) | 21 (52) | 23 (−15) | 31 (58) | 17 (−11) |
| Ex. 6 (5 μm) | 19 (54) | 25 (−17) | 30 (59) | 18 (−12) |

With reference to the illustrative embodiments of Tables I-J, the difference in haze between the first and second microstructured surfaces can be at least 10%. Further, in some embodiments, the difference in haze between the first and second microstructured surfaces can be at least 20%, 30%, 40%, 50%, 60%, or 70%.

The first microstructured surface can have a haze of at least 60, 70, 80, or 90%. However, the second microstructured surface can have a haze of less than or equal to 50, 45, 40, 35, 30, 25, 20, 15, or 10%. In some embodiments, the haze is less than 10, 9, 8, 7, 6, 5, 4, 3, or 2%.

With reference to the illustrative embodiments of Table I-J, the difference in clarity between the first and second microstructured surfaces is at least −10%. Further, the difference in clarity between the first and second microstructured surfaces is at least −20%, −25%, −30%, −35%, or −40%.

The first microstructured surface can have a clarity of less than 10, 9, 8, 7, 6, or 5%. However, the second microstructured surface can have a clarity of at least 15, 20, 25, 30, 35, 40, or 45%.

The microstructured diffuser comprising a coating disposed on a first microstructured can be utilized in various optical films.

Figure 12:
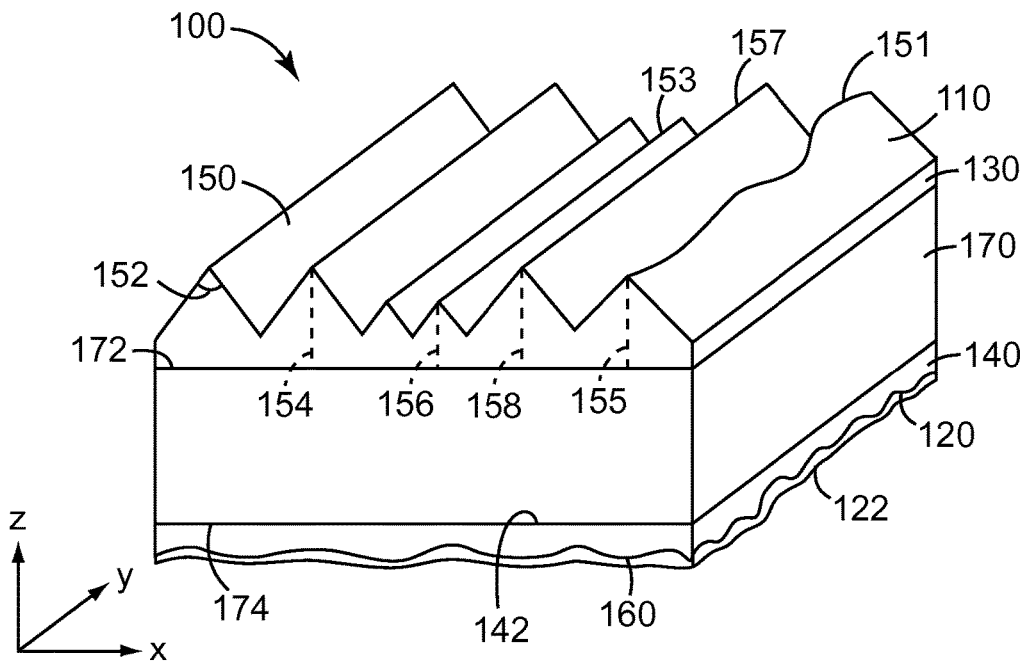
FIG. 12 is a schematic side-view of light redirecting film comprising a microstructured diffuser.

In some embodiments, the microstructured diffuser further comprises prism structures on a major surface opposing the first and second microstructured surface layers as depicted in FIG. 12. Thus, the (e.g. first) microstructured surface is not embedded between the substrate and a prismatic layer. However, in another embodiment, the microstructured diffuser comprising a coating disposed on a first microstructured can be embedded between the substrate and the prismatic layer, such as described in WO2013/158475; incorporated herein by reference.

The microstructures of the microstructured (e.g. diffuser) layer are different than the (e.g. prism) structures of the optical film designed primarily to provide optical gain. In one aspect, the microstructures of the microstructured (e.g. diffuser) layer form an irregular pattern or a pseudo-random pattern that appears to be random. In contrast, the (e.g. prism) structures of the optical film generally have a nominally regular pattern. In another aspect, the microstructures of the microstructured (e.g. diffuser) layer are typically smaller than the (e.g. prism) structures of the optical film. For example, the microstructures of the microstructured (e.g. diffuser) layer typically have an average peak to valley height of no greater than 8 microns; whereas the (e.g. prism) structures typically have a peak to valley height of greater than 8, 9, or 10 microns. In another aspect, the (e.g. prism) structures of the optical film have substantially the same slope (e.g. apex angle of about 90°); whereas the microstructured (e.g. diffuser) layer has microstructures having different magnitudes of slope as previously described. In many embodiments, a least 90% of the microstructures of the microstructured diffuser have a slope magnitude of less than 20 or 15 degrees.

FIG. 12 is a schematic side-view of a light redirecting film 100 for redirecting an incident light toward a desired direction. Light redirecting film 100 includes a first major surface 110 that includes a plurality of microstructures 150 that extend along the y-direction. When microstructures 150 are prisms, such microstructured layer may be described as a prismatic layer. Light redirecting film 100 also includes a second major surface 120 that is opposite first major surface 110 and includes a first microstructured layer 60 and a coating disposed one the first microstructured surface wherein the coating partially fills the valleys forming a second microstructured surface 122.

Light redirecting film 100 also includes a substrate layer 170 that is disposed between respective first and second major surfaces 110 and 120 and includes a first major surface 172 and an opposing second major surface 174. Light redirecting film 100 also includes a prism layer 130 that is disposed on first major surface 172 of the substrate layer and includes first major surface 110 of the light redirecting film, and a matte layer 140 that is disposed on second major surface 174 of the substrate layer and includes second major surface 174 of the light redirecting film. The matte layer has a major surface 142 opposite major surface 120.

The exemplary light redirecting film 100 includes three layers 130, 170 and 140. In general, the light redirecting film can have one or more layers. For example, in some cases, the light redirecting film can have a single layer that includes respective first and second major surfaces 110 and 120. As another example, in some cases, the light redirecting film can have many layers. For example, in such cases, substrate 170 can have multiple layers.

Microstructures 150 are primarily designed to redirect light that is incident on major surface 120 of the light redirecting film, along a desired direction, such as along the positive z-direction. In the exemplary light redirecting film 100, microstructures 150 are prismatic linear structures. In general, microstructures 150 can be any type microstructures that are capable of redirecting light by, for example, refracting a portion of an incident light and recycling a different portion of the incident light. For example, the cross-sectional profiles of microstructures 150 can be or include curved and/or piece-wise linear portions. For example, in some cases, microstructures 150 can be linear cylindrical lenses extending along the y-direction.

Each linear prismatic microstructure 150 includes an apex angle 152 and a height 154 measured from a common reference plane such as, for example, major plane surface 172. In some cases, such as when it is desirable to reduce optical coupling or wet-out and/or improve durability of the light redirecting film, the height of a prismatic microstructure 150 can change along the y-direction. For example, the prism height of prismatic linear microstructure 151 varies along the y-direction. In such cases, prismatic microstructure 151 has a local height that varies along the y-direction, a maximum height 155, and an average height. In some cases, a prismatic linear microstructure, such as linear microstructure 153, has a constant height along the y-direction. In such cases, the microstructure has a constant local height that is equal to the maximum height and the average height.

Effective transmission (ET) can be measured using an optical system as described in FIG. 2 of WO2010/141262; incorporated by reference.

In some cases, such as when it is desirable to reduce optical coupling or wet-out, some of the linear microstructures are shorter and some of the linear microstructures are taller. For example, height 156 of linear microstructure 153 is smaller than height 158 of linear microstructure 157.

Apex or dihedral angle 152 can have any value that may be desirable in an application. For example, in some cases, apex angle 152 can be in a range from about 70 degrees to about 110 degrees, or from about 80 degrees to about 100 degrees, or from about 85 degrees to about 95 degrees. In some cases, microstructures 150 have equal apex angles which can, for example, be in a range from about 88 or 89 degree to about 92 or 91 degrees, such as 90 degrees.

Prism layer 130 can have any index of refraction that may be desirable in an application. For example, in some cases, the index of refraction of the prism layer is in a range from about 1.4 to about 1.8, or from about 1.5 to about 1.8, or from about 1.5 to about 1.7. In some cases, the index of refraction of the prism layer is not less than about 1.5, or not less than about 1.55, or not less than about 1.6, or not less than about 1.65, or not less than about 1.7.

In some cases, such as when light redirecting film 100 is used in a liquid crystal display system, the light redirecting film 100 can increase or improve the brightness of the display. In such cases, the light redirecting film has an effective transmission or relative gain that is greater than 1. As used herein, effective transmission is the ratio of the luminance of the display system with the film in place in the display system to the luminance of the display without the film in place.

In some cases, such as when light redirecting film 100 is used in a display system to increase the brightness and the linear prisms have an index of refraction that is greater than about 1.6, the average effective transmission (ETA) of the light redirecting film is not less than about 1.5, or not less than about 1.55, or not less than about 1.6, or not less than about 1.65, or not less than about 1.7, or not less than about 1.75, or not less than about 1.8, or not less than about 1.85.

Figure 14:
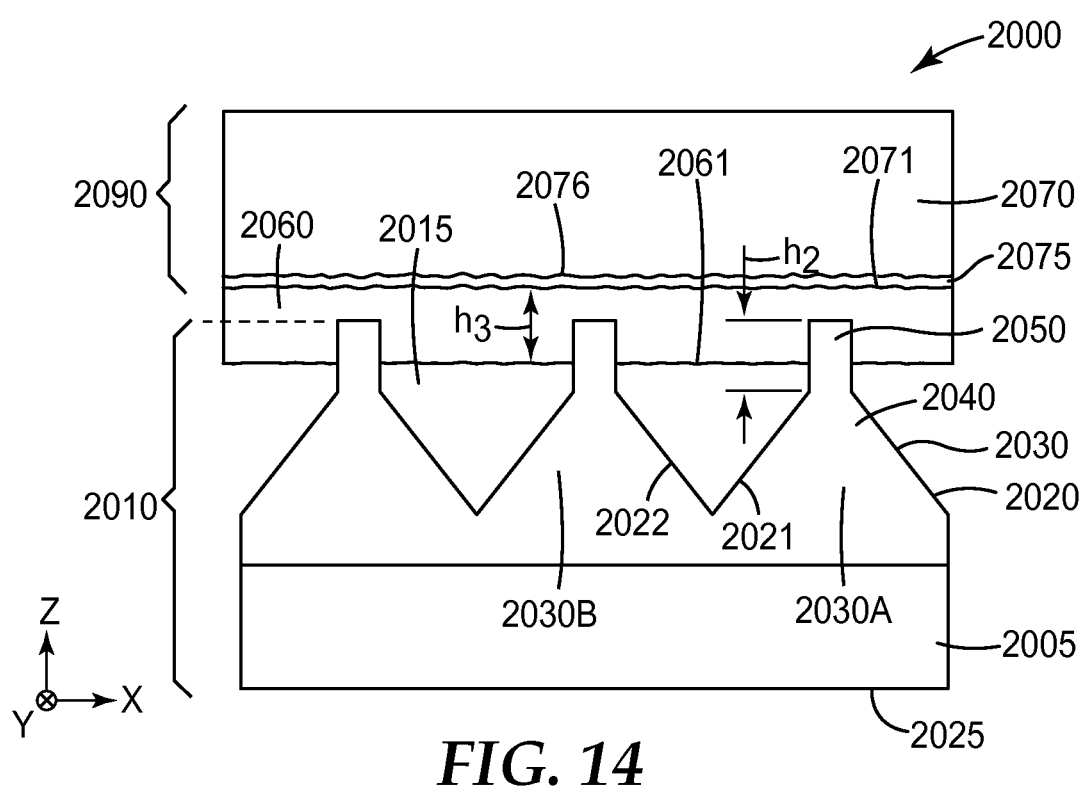
FIG. 14 is a schematic side-view of an optical stack.

In other cases, such as when a stack of two light redirecting films are used in a display system to increase the brightness (such as depicted in FIG. 14), the average effective transmission (ETA) can be at least 1.9, 2.0, or 2.1 and may range up to 2.4, 2.5, or 2.6.

The second microstructured surface 122 is primarily designed to hide undesirable physical defects (such as, for example, scratches) and/or optical defects (such as, for example, undesirably bright or "hot" spots from a lamp in a display or illumination system or special interferences of patterns, often referred to as moiré) with no, or very little adverse, effect on the capabilities of the light redirecting film to redirect light and enhance brightness.

Optical films comprising the microstructured diffuser as described herein can be utilized in various optical film stacks. In some embodiments, the optical film stacks include a single light directing (e.g. prism) film designed to increase gain and a non-prismatic microstructured diffuser. In other embodiments, the optical stacks include at least two light directing (e.g. prism) films designed to increase gain. The prism films are typically stacked such that the apices of the first prism film are orthogonal to the apices of the second prism film. In one embodiment, the optical film or optical film stack comprises an optically non-active bonding portion are described for example in WO2011/130155; WO2011/130144; WO2011/130151; and WO 2013/138495.

Figure 13:
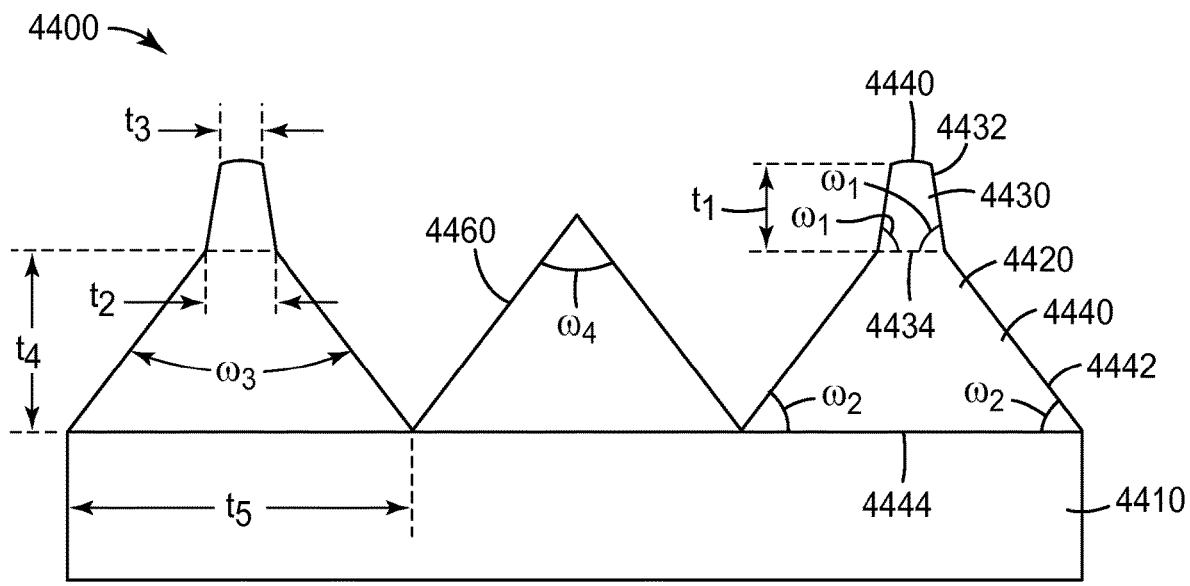
FIG. 13 is a schematic side-view of another light redirecting film.

One illustrative optical film comprising optically non-active bonding portions is depicted in FIG. 13. Light directing film 4400 includes a first plurality of linear symmetric unitary discrete structures 4420 and a second plurality of linear symmetric discrete structures 4460. Structures 4420 and 4460 extended along the y-direction and were disposed on a substrate 4410. Substrate 4410 was made of PET, had a thickness of about 29 microns and an index of refraction of about 1.65. The cured index of refraction of structures 4420 and 4460 was about 1.56. Each unitary discrete structure included a bonding portion 4430 designed primarily for bonding the light directing film to a surface and disposed on a light directing portion 4440 designed primarily for directing and recycling light. Discrete structures 4460 did not include any bonding portions and were primarily designed to direct and recycle light. Unitary discrete structures 4420 alternated with discrete structures 4460.

Each bonding portion 4430 included two opposing side facets 4432 that made angles $\omega_1$ with the xy-plane (the plane of the light directing film) that were about 80-85 degrees. Each bonding portion had a base 4434, a minimum base dimension t2 that was about 1.5 (±0.5) microns, and a maximum height t1 that was about 4 (±0.5) microns. Each bonding portion also included a curved or rounded top surface that had a minimum top surface dimension t3 of about 0.2 (±0.2) microns. Each light directing portion 4420 included two opposing side facets 4442 that made angles $\omega 2$ with the xy-plane (the plane of the light directing film) that was about 45 degrees. Each light directing portion had a base 4444, a minimum base dimension t5 of about 24 microns, and a maximum height t4 that was about 12 microns. The z-axis offset height difference between the apex of the bonding portion 4430 of unitary discrete structure 4420 and the apex of the apex of discrete structure 4460 was 2.6 microns. Light directing film 4400 had an average effective transmission ETA of about 1.63.

Other suitable illustrative optical films comprising optically non-active bonding portions are described in WO 2012/138495; incorporated herein by reference.

The optical film of FIG. 13 can be included in an optical film stack as depicted in FIG. 14, a schematic side-view of an optical stack 2000 that includes an optical film comprising the first and second microstructured surfaces described herein 2090 that is optionally disposed on a light directing film (e.g. prism) 2010. Light directing film 2010 includes a first structured major surface 2020 and an opposing second major surface 2025. First structured major surface 2020 includes a plurality of unitary discrete structures 2030 that are disposed on a substrate 2005. Each of at least some unitary discrete structures include a light directing portion 2040 primarily for directing light and a bonding portion 2050 primarily for bonding the light directing film to optical film 2090. In some cases, such as in the case of the exemplary optical stack 2000, at least portions of at least some bonding portions 2050 of light directing film 2010 penetrate into optical film 2090 and at least portions of at least some light directing portions 2040 of light directing film 2010 do not penetrate into optical film 2090. In such cases, optical stack 2000 includes a plurality of unfilled voids 2015 between light directing film 2010 and optical film 2090, where the unfilled voids can contain air and/or a gas. In some cases, each of at least some of the plurality of unfilled voids 2015 substantially covers a region that is defined by optical film 2090 and portions of two or more adjacent unitary discrete structures 2030 that do not penetrate into the optical film and immediately surround the region. For example, in such cases, an unfilled void covers at least 50%, or at least 60%, or at least 70%, or at least 80%, or at least 90%, of a region that is defined by optical film 2090 and portions of two or more adjacent unitary discrete structures 2030 that do not penetrate into the optical film. For example, in the case of linear unitary discrete structures 2030, unfilled void 2015 substantially covers the region that is defined on the top by optical film 2090, on the right side by portion 2021 of linear unitary discrete structure 2030A that has not penetrated into the optical film, and on the left side by portion 2022 of linear unitary discrete structure 2030B that has not penetrated into the optical film.

Optical film 2090 includes a light transmissive substrate optionally further comprising a (e.g. prismatic) optical layer 2070, optional primer layer 2075 disposed on light transmissive substrate 2070 and coating (e.g. optical adhesive) layer 2060 disposed on optional primer layer 2075. When the primer layer is not present, coating 2060 is disposed directly on the first microstructured surface 2076 of optical film 2090. The portions of bonding portions 2050 of light directing film 2010 that penetrate into the optical film penetrate into the coating (e.g. optical adhesive) layer. Coating (e.g. optical adhesive) layer 2060 attaches or bonds light directing film 2010 to optical layer 2070 or major surface 2071 of optical layer 2070 while substantially maintaining an air environment or surrounding for light directing portions 2040. In some cases, bonding portions 2050 have high aspect ratios which can result in strong bonding between optical film 2090 and light directing film 2010.

Bonding portions 2050 that penetrate into coating (e.g. optical adhesive) layer have an average maximum height $h_{2,avg}$ which is the average of the maximum heights $h_2$ of the individual bonding portions that have penetrated into the coating (e.g. optical adhesive) layer. In some cases, $h_{2,avg}$ is greater than the average thickness $h_3$ of coating (e.g. optical adhesive) layer 2060. For example, in such cases, $h_{2,avg}$ is greater than $h_3$ by at least 0.2 microns, or at least 0.3 microns, or at least 0.4 microns, or at least 0.5 microns, or at least 0.7 microns, or at least 1 micron, or at least 1.2 microns, or at least 1.5 microns, or at least 1.7 microns, or at least 2 microns.

When the average heights of the individual bonding portions is greater than the average thickness $h_3$ of the coating (e.g. optical adhesive) layer, the height of the bonding portions can create a physical separation between the optically active portions of the structures and the adhesive layer. This separation or air interface is maintained or substantially unchanged, provided that the adhesive composition does not flow or "creep" during the normal usage of the stack. Such usage can be simulated by use of aging tests at elevated temperatures, optionally in combination with increased humidity.

Alternatively, when the average heights of the individual bonding portions is less than the average thickness $h_3$ of the coating (e.g. optical adhesive) layer, the depth of penetration and maintaining such penetration during the normal usage of the stack provides the separation between the optically active portions of the structures and the adhesive layer.

In one embodiment, the coating (e.g. optical adhesive) layer has an average thickness $h_3$ of about 3 to 6 microns; and the bonding portions have an average maximum height $h_{2,avg}$ of about 4 microns.

In general, optical film substrate 2070, can include any optical layer and provide any function that may be desirable in an application. For example, in some cases, the substrate may primarily provide support for other layers. As another example, the disclosed substrate may polarize light by including, for example, a reflective or absorbing polarizer, diffuse light by including an optical diffuser, direct or redirect light by including a light directing film.

The first microstructured surface layer typically comprises a polymeric material such as the reaction product of a polymerizable resin. A variety of free-radically polymerizable (e.g. (meth)acrylate)) monomers, oligomers, polymers, and mixtures thereof can be employed in the organic material of the first microstructured surface layer. In some embodiments, the polymerizable resin further comprises inorganic oxide nanoparticles.

The polymerizable resin of the first microstructured layer typically comprises at least one aromatic (meth)acrylate monomer having two (meth)acrylate groups (i.e. a di(meth) acrylate monomer). The amount of aromatic di(meth)acrylate monomer is typically at least 5 wt-% and no greater than about 80 wt-%. When the polymerizable resin is free of inorganic oxide nanoparticles, the amount of aromatic di(meth)acrylate monomer is typically at least 10, 15, 20, or 25 wt-% or greater. When the polymerizable resin further comprises inorganic oxide nanoparticles, the amount of aromatic di(meth)acrylate monomer typically does not exceed 25 wt-%.

In some embodiments, the di(meth)acrylate monomer is derived from bisphenol A. One exemplary bisphenol-A ethoxylated diacrylate monomer is commercially available from Sartomer under the trade designations "SR602" (reported to have a viscosity of 610 cps at 20° C. and a Tg of 2° C.). Another exemplary bisphenol-A ethoxylated diacrylate monomer is as commercially available from Sartomer under the trade designation "SR601" (reported to have a viscosity of 1080 cps at 20° C. and a Tg of 60° C.). Various other bisphenol A monomers have been described in the art, such as those described in U.S. Pat. No. 7,282,272.

In other embodiments, the polymerizable composition is free of monomer derived from bisphenol A. One suitable difunctional aromatic (meth)acrylate monomer is a biphenyl di(meth)acrylate monomer is described in US2008/0221291; incorporated herein by reference. The biphenyl di(meth)acrylate monomers may the general structure

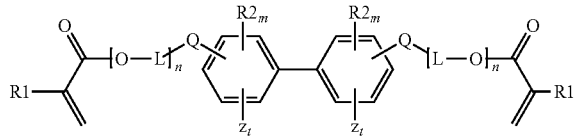

wherein each R1 is independently H or methyl;
each R2 is independently Br;
m ranges from 0 to 4;
each Q is independently O or S;
n ranges from 0 to 10;
L is a C2 to C12 alkylene group optionally substituted with one or more hydroxyl groups;
z is an aromatic ring; and
t is independently 0 or 1.

At least one, and preferably both, of the -Q[L-O]n C(O) C(R1)=CH$_2$ groups are substituted at the ortho or meta position such that the monomer is a liquid at 25° C.

In some embodiments, the difunctional aromatic (meth) acrylate monomer is combined with an aromatic mono (meth)acrylate monomer having a molecular weight less than 450 g/mole and having a refractive index of at least 1.50, 1.51, 1.52, 1.53, 1.54, 1.55, 1.56, 1.57 or 1.58. Such reactive diluents typically comprise a phenyl, biphenyl, or naphthyl group. Further such reactive diluents can be halogenated or non-halogenated (e.g. non-brominated). The inclusion of reactive diluents can concurrently raise the refractive index of the organic component and improve the processability of the polymerizable composition by reducing the viscosity.

The concentration of aromatic mono(meth)acrylate reactive diluents is typically at least 5, 6, 7, 8, 9, or 10 wt-%. In some embodiments, the concentration of aromatic mono (meth)acrylate reactive diluents is no greater than 50, 40 or 30 wt-% of the polymerizable resin composition.

Suitable reactive diluents include for example various biphenyl (meth)acrylate monomers such as described in WO2008/112451; incorporated herein by reference. Other suitable reactive diluents include phenoxy ethyl (meth) acrylate; phenoxy-2-methylethyl (meth)acrylate; phenoxyethoxyethyl (meth)acrylate, 3-hydroxy-2-hydroxypropyl (meth)acrylate; benzyl (meth)acrylate; phenylthio ethyl acrylate; 2-naphthylthio ethyl acrylate; 1-naphthylthio ethyl acrylate; 2,4,6-tribromophenoxy ethyl acrylate; 2,4-dibromophenoxy ethyl acrylate; 2-bromophenoxy ethyl acrylate; 1-naphthyloxy ethyl acrylate; 2-naphthyloxy ethyl acrylate; phenoxy 2-methylethyl acrylate; phenoxyethoxyethyl acrylate; 3-phenoxy-2-hydroxy propyl acrylate; 2,4-dibromo-6-sec-butylphenyl acrylate; 2,4-dibromo-6-isopropylphenyl acrylate; benzyl acrylate; phenyl acrylate; 2,4,6-tribromophenyl acrylate. Other high refractive index monomers such as pentabromobenzyl acrylate and pentabromophenyl acrylate can also be employed.

The first microstructured layer may optionally comprise inorganic nanoparticles, such as silica, typically having a low refractive index (e.g. less than 1.50). Silica is commercially available from Nalco Chemical Co., Naperville, Ill. under the trade designation "Nalco Collodial Silicas" such as products 1040, 1042, 1050, 1060, 2327 and 2329. Fumed silica is also commercially available.

The first microstructured layer may optionally comprise various high refractive index particles such as zirconia ("ZrO$_2$"), titania ("TiO$_2$"), antimony oxides, alumina, tin oxides, alone or in combination. Mixed metal oxide may also be employed. Zirconias for use in the high refractive index layer are available from Nalco Chemical Co. under the trade designation "Nalco OOSSOO8" and from Buhler AG Uzwil, Switzerland under the trade designation "Buhler zirconia Z-WO sol". Zirconia nanoparticle can also be prepared such as described in U.S. Pat. Nos. 7,241,437 and 6,376,590. The maximum refractive index of the matte layer is typically no greater than about 1.75 for coatings having high refractive index inorganic (e.g. zirconia) nanoparticles dispersed in a crosslinked organic material.

The concentration of (e.g. zirconia) inorganic nanoparticles in the first microstructured surface layer is typically at least 25 wt-% or 30 wt-%. The concentration of (e.g. zirconia) inorganic nanoparticles is typically at least 40 wt-% and no greater than about 70 wt-% or 60 wt-% or 50 wt-%.

The inorganic nanoparticles are preferably treated with a surface treatment agent. Various surface treatments are known, some of which are described in US2007/0286994.

Silanes can be preferred for silica and other for siliceous fillers. Silanes and carboxylic acids are preferred for metal oxides such as zirconia. The high refractive index (e.g. zirconia) nanoparticles may be surface treated with a surface treatment comprising a compound comprising a carboxylic acid end group and a C$_3$-C$_8$ ester repeat unit or at least one C$_6$-C$_{16}$ ester unit, as described in WO2010/074862; incorporated herein by reference.

Various polymerizable resins that have been described for fabricating light directing (e.g. prism) structures by casting and curing are suitable for fabricating the first microstructured layer. Some suitable polymerizable resin compositions are described in US2009/0017256 and U.S. Pat. No. 8,263,863; incorporated herein by reference.

In some embodiments, the refractive index of the polymerizable resin of the first microstructured layer is selected such it is index matched to the light transmissive substrate. In such embodiment, the difference in refractive index between the polymerizable resin of the first microstructured layer and the light transmissive substrate is no greater than 0.05, 0.04, 0.03, 0.02 or 0.01. In other embodiments, the difference in refractive index between the polymerizable resin of the first microstructured layer and the light transmissive substrate is at least 0.10, 0.15, or 0.20.

In some embodiments, the first microstructured layer has a high refractive of at least 1.60 or greater. In some embodiments, the refractive index is at least 1.62 or at least 1.63 or at least 1.64 or at least 1.65. In other embodiments, the first microstructured layer has a refractive index of less than 1.60. For example, the microstructured layer may have refractive index ranging from about 1.40 to about 1.60. In some embodiments, the refractive index of the microstructured layer is at least about 1.49, 1.50, 1.51, 1.52, 1.53, or 1.54.

The method of making a microstructured article as described herein generally comprises providing a substrate comprising a first microstructured surface, the first microstructured surface comprising a plurality of peaks and valleys. The first microstructured surface is preferably fabricated by casting and curing a polymerizable resin composition in contact with a tool surface, as previously described. The method further comprises coating the first microstructured surface such that the coating partially fills the valley forming a second microstructured surface.

Although low viscosity solvent-free coating compositions can be also be used for the purpose of coating the first microstructured surface, in typical embodiments the coating composition is a dilute coating solution comprising an organic solvent. In some embodiments, the coating composition comprises at least 50, 60, 70, 80, or 90 wt-%, or greater volatile organic solvent. Representative solvents include acetone, methyl-ethyl-ketone, ethyl acetate, heptane, toluene, cyclopentanone, methyl cellosolve acetate, methylene chloride, nitromethane, methyl formate, gamma-butyrolactone, propylene carbonate, and 1,2-dimethoxyethane (glyme).

Providing the coating as a dilute solution is amenable to filling the valleys of the first microstructured surface without forming voids or air bubbles. In a typical process, solvent is removed via drying to yield a thin dried and preferably cured coating. The evaporation of the solvent results in the dried coating thickness being less than the applied coating thickness. For example, when the coating composition contains 90 wt-% of volatile solvent and is applied at a thickness of 3 microns, the dried coating has an average thickness of about 0.3 microns. Thus, providing the coating as a dilute coating solution is also amendable to providing the low dried average coating thicknesses, as previously described.

The coating may be applied by any conventional application method, including but not limited to gravure coating, curtain coating, slot coating, spin coating, screen coating, brush or roller coating, and the like.

The solvent is typically evaporated by use of heat. For example, the coated first microstructured surface may be conveyed through an oven having a temperature ranging from about 130 to 160° F. Thermoplastic polymers and other polymerizable components typically exhibit a lower viscosity at increased temperature. Thus, when the coating is dried at an elevated temperature, the thermoplastic polymer or other polymerizable component can readily flow, descending from the peaks thereby increasing the coating thickness in the valleys. Thus, even though the coating may be applied to the entire first microstructured surface, the dried coating typically has a lower thickness at the peaks than in the valleys.

In some embodiments, the coating is a (e.g. dilute) polymerizable resin composition, such as the previously described polymerizable resin compositions suitable for use in preparing the first microstructured layer.

In other embodiments, the coating is a (e.g. optical) adhesive. Various (e.g. dilute) optical adhesives, as known in the art, are suitable for use as the coating. (See for example US2006/0027321 and Application Ser. No. 61/778,679, filed Mar. 13, 2013).

The coating may comprise a preformed thermoplastic polymer. For example, the coating may comprise a polyacrylate, otherwise known as an acrylic polymer. The thermoplastic polymer may be dissolved in a polymerizable monomer, an organic solvent or a combination thereof.

When the coating comprises a polymerizable monomer, the coating is generally cured. Curing of the coating can be beneficial to retain the second microstructured surface formed on the first microstructured surface. In some embodiments, the coating comprises free-radically polymerizable (e.g. (meth)acrylate)) monomers, oligomers, polymers, and mixtures thereof that are cured by exposure to (e.g. ultraviolet) radiation. In other embodiment, the coating comprises an epoxy resin that is cationically cured (e.g. while evaporating the solvent from the coating).

For embodiments wherein an optical stack is formed, the method may further comprise contacting the (e.g. dried) coating to a surface of another optical film prior to curing. In some embodiments, prism structures or posts extending from an apex of the prisms may partially penetrate the coating.

In one embodiment, the coating disposed on the first microstructured surface comprises the reaction product of a polyacrylate and a polymerizable monomer having functional groups and a molecular weight less than 150 g/mole per functional group. The polymerizable monomer may be a free-radically polymerizable (meth)acrylate monomer or an epoxy resin as described in previously cited WO 2012/138495.

In some embodiments, the coating is a single layer of the same composition. In other embodiments, the coating comprises more than one layer (e.g. of different compositions). For example, the coating may include a primer layer and an (e.g. optical) adhesive layer. The primer layer may be disposed between the first microstructured surface layer and the (e.g. optical adhesive) coating as described in U.S. Provisional Application No. 61/885,760, filed Oct. 2, 2013; incorporated herein by reference. The primer may comprise a polyacrylate (e.g. pressure sensitive adhesive). In some embodiments, the primer layer further comprises a nitrogen containing polymer.

In some embodiments, the cured coating can be characterized by use of dynamic mechanical analysis (as further described in the examples). The elastic modulus of the cured adhesive is typically at least 100 MPa. In some embodiments, the elastic modulus, is at least 200 MPa, or 300 MPa, or 400 MPa, or 500 MPa. The elastic modulus is typically no greater than 2000 MPa. The elastic modulus (E') at 25° C. is surmised related, at least in part, to the coating being retained in the partially filled valleys such that the optical and physical property of the second microstructure surface does not substantially change with aging. The elastic modulus is also related, at least in part to the retained brightness and/or penetration of the optical stack with aging.

In some embodiments, the refractive index of the coating may be index matched to the first microstructured layer is selected such it is index matched to the light transmissive substrate. In such embodiment, the difference in refractive index between the (e.g. polymerizable resin of) first microstructured layer and coating is no greater than 0.05, 0.04, 0.03, 0.02 or 0.01.

EXAMPLES

Microstructured Surface Characterization

Surface profile data that gives height of the surface as a function of x and y positions was obtained by confocal scanning laser microscopy (CSLM) with a 50× objective. Representative areas of the films (e.g. about 500×500 microns) were used for image analysis.

Slope Analysis

Surface profile data gives height of the surface as a function of x and y positions. This data will be represented as a function H(x,y). The x direction of the image is the horizontal direction of the image. The y direction of the image is the vertical direction of the image.

MATLAB was used to calculate the following:
1. gradient vector $$\nabla H(x, y) = \left( \frac{\partial H(x, y)}{\partial x}, \frac{\partial H(x, y)}{\partial y} \right)$$

-continued $$= \left(\frac{H(x+\Delta x, y) - H(x-\Delta x, y)}{2\Delta x}, \frac{H(x, y+\Delta y) - H(x, y-\Delta y)}{2\Delta y}\right)$$

2. slope magnitude of gradient vector (in degrees)

$$\theta = \arctan(|\nabla H(x, y)|)$$

$$= \arctan\left(\sqrt{\left(\frac{H(x+\Delta x, y) - H(x-\Delta x, y)}{2\Delta x}\right)^2 + \left(\frac{H(x, y+\Delta y) - H(x, y-\Delta y)}{2\Delta y}\right)^2}\right)$$

3. x-slope (in degrees)

$$\theta = \arctan\left(\frac{H(x+\Delta x, y) - H(x-\Delta x, y)}{2\Delta x}\right)$$

4. y-slope (in degrees)

$$\theta = \arctan\left(\frac{H(x, y+\Delta y) - H(x, y-\Delta y)}{2\Delta y}\right)$$

5. $F_{CC}(\theta)$—complement cumulative distribution of the gradient slope distribution $$F_{CC}(\theta) = \frac{\sum_{q=\theta}^{\infty} N_G(q)}{\sum_{q=0}^{\infty} N_G(q)}$$

$F_{CC}(\theta)$ is the complement of the cumulative slope distribution and gives the fraction of slopes that are greater than the specified angle $\theta$. $N_G(q)$ is the number of pixels in the qth angle bin, where each angle bin has a size of 0.01°. (Thus, the first angle bin is the fraction of the number of pixels having slopes of greater than 0° up to 0.01°, the second angle bin is the fraction of the number of pixels having slopes greater than 0.01° up to 0.02°, etc.) Complements of the cumulative slope distribution for x- and y-slopes are defined similarly.

MATLAB with the image processing tool box was used to analyze the height profiles and compute surface slopes. The following sequence gives an outline of the steps in the MATLAB code that were used.

1. If number of pixels>=1001*1001 then reduce number of pixels
   calculate nskip=fix(na*nb/1001/1001)+1
   where the original image has size na×nb pixels
   if nskip>1 then carry out (2*fix(nskip/2)+1)×(2*fix(nskip/2)+1) median averaging
      fix is a function that rounds down to the nearest integer.
   create new image keeping every nskip pixel in each direction (e.g. keep rows and columns 1, 4, 8, 11 . . . if nskip=3)

2. r=round(Δx/pix)
   Δx is the step size that will be used in the slope calculation
   pix is the pixel size.
   r is Δx rounded to the nearest whole numbers of pixels 3. Δx (and Δy) were 0.825 microns for all slope calculations 4. Perform median averaging with window size of (2*round($f_{MX}$*r)+1) by (2*round($f_{MY}$*r)+1) pixels. Both $f_{MX}$ and $f_{MY}$ were 0.5 for this computation.

5. Remove tilt.
   effectively makes the average slope across the entire profile in all directions equal to zero 6. Calculate slope profiles as previously described.

Roughness Metrics

Ra—Average roughness calculated over the entire measured array.

$$Ra = \frac{1}{MN}\sum_{j=1}^{M}\sum_{k=1}^{N}|Z_{jk}|$$

wherein $Z_{jk}$=the difference between the measured height of each pixel and the mean height of the array.

Rz is the average maximum surface height of the ten largest peak-to-valley separations in the evaluation area, $$Rz = \frac{1}{10}[(H_1 + H_2 + \ldots + H_{10}) - (L_1 + L_2 + \ldots + L_{10})].$$

where H is a peak height and L is a valley height, and H and L have a common reference plane.

Each value reported for the complement cumulative slope magnitude distribution, peak dimensions, and roughness were based on an average of two areas.

Measurement of Haze and Clarity:

Haze and clarity values disclosed herein were measured using a Haze-Gard Plus haze meter (BYK-Gardiner, Silver Springs, Md.) according to the procedure described in ASTM D1003. Optical haze, as used herein, is defined as the ratio of the transmitted light that deviates from the normal direction by more than 4 degrees to the total transmitted light. Optical clarity is defined as $(T_1-T_2)/(T_1+T_2)$, where $T_1$ is the transmitted light that deviates from the normal direction between zero and 0.7 degrees, and $T_2$ is the transmitted light that lies between 1.6 and 2 degrees from the normal direction. In all cases, the optical films were measured with the coating or microstructured surface facing toward the light source.

Measurement of Optical Gain

Each film or film laminate was placed on top of a diffusively transmissive hollow light box. The diffuse transmission and reflection of the light box were approximately Lambertian. The light box was a six-sided hollow rectangular solid of dimensions 12.5 cm by 12.5 cm by 11.5 cm made from diffuse PTFE plates about 0.6 mm thick. One face of the box was designated as the sample surface. The hollow light box had a diffuse reflectance of about 0.83% measured at the sample surface averaged over the 400-700 nm wavelength range. During the gain test, the box was illuminated from within through a circular hole about 1 cm in diameter in the surface of the box opposite the sample surface, with the light directed toward the sample surface. The illumination was provided by a stabilized broadband incandescent light source attached to a fiber optic bundle used to direct the light (available as Fostec DCR-III with a one cm diameter fiber bundle extension from Schott North America, Southbridge Mass.). A linear absorbing polarizer (available as Melles Griot 03 FPG 007 from CVI Melles Griot, Albuquerque N. Mex.) was mounted on a rotary stage (available as ART310-UA-G54-BMS-9DU-HC from Aerotech, Pittsburgh, Pa.) and placed between the sample and the camera. The camera was focused on the sample surface of the light box at a distance of 0.28 m and the absorbing polarizer was placed about 1.3 cm from the camera lens. The luminance of the illuminated light box, measured with the polarizer in place and no sample films in place was greater than 150 cd/m$^2$. The sample luminance was measured with an EPP2000 spectrometer (available from StellarNet Inc, Tampa, Fla.) connected to a collimating lens via a Vis-NIR fiber optic cable (available as F1000-Vis-NIR from StellarNet Inc, Tampa, Fla.); the spectrometer was oriented at normal incidence to the plane of the box sample surface when the sample films were placed on the sample surface. The collimating lens is composed of a lens tube (available as SM1L30 from Thorlabs, Newton, N.J.) and a plano-convex lens (available as LA1131 from Thorlabs, Newton, N.J.); the setup was assembled to achieve a focused spot size of 5 mm at the detector. Optical gain was determined as the ratio of the luminance with the sample film in place to the luminance from the light box with no sample present. For all films, optical gain was determined at polarizer angles of 0, 45 and 90 degrees relative the sample orientation. The average optical gain of the values measured at 0 and 90 degrees is reported.

Examples 1-6

Microstructured layers were cast and cured onto a primed side of a 1.14 mil PET film. The primer composition of the primed side contained an acrylic polymeric binder (Rhoplex 3208 available from Dow Chemical Company, Midland Mich.) and a melamine based curing resin (Cymel 327 available from Allnex, Anderlecht Belgium). The melamine curing resin is typically characterized by a number average molecular weight (Mn) of 450 g/mole. The primer thickness was 90 nm and contained 3.5% melamine on total primer solids.

Two different UV polymerizable acrylate resins, one having a refractive index (RI) of 1.56 (Resin R8 of US2009/0017256) and the other having a refractive index of 1.65 (Example 2 of U.S. Pat. No. 8,282,863), were cast and cured in contact with a tool surface to form a layer having a microstructured surface that was an inverse of the tool surface.

Two tools (Tool 1 and Tool 2) were utilized to prepare the microstructured surfaces. The tools were prepared using a diamond turning system that utilizes a fast tool servo (FTS) as previously described.

For each of the examples, an adhesive solution was coated onto the microstructured surface using a solvent coater at a line speed of 26 feet per minute resulting at (dried) coating thicknesses of 3, 4 or 5 microns. The adhesive was cured with UV-D bulbs operating at 100% power with a dichroic reflector and a UV backup roll set at 60° F.

The cured adhesive contained the reaction product of the following components

| Component | Wt-% |
|---|---|
| Polyacrylate PSA - terpolymers of isooctyl acrylate (50%), ethyl acrylate (40% and acrylic acid (10%) having an intrinsic viscosity of 1.6 | 62.0 |
| Cyclocliphaic diepoxide monomer ("Uvacure 1500" available from Cytec Industries) | 28.6 |
| Plasticizer (diethyl phthalate) | 4.8 |
| Photoinitiator ("Uvacure 1600" available from Cytec Industries) | 4.4 |
| Photosensitizer ("Additol ITX", available from Cytec Industries) | 0.2 |

The adhesive coating solution comprised the components just described dispersed in an organic solvent at a concentration of 10 wt-% solids of adhesive.

In the case of the "Control" no adhesive was applied. Thus, the control is the first microstructured surface in the absence of a (e.g. adhesive) coating.

Confocal scanning laser microscopy images of the microstructured surfaces were created are previously described. The microstructured surfaces produced from Tool 1 are depicted in FIGS. 8A-8D; whereas the microstructured surfaces produced from Tool 2 are depicted in FIGS. 9A-9D.

The complement of the cumulative surface gradient magnitude (Fcc), which shows the percentage of slopes that are greater than a given angle is shown in FIGS. 10 and 11. This same data in tabular form is reported in previously described Tables A and B. Although the first microstructured surface layers fabricated from the 1.56 RI resin were used for generating the surface roughness, mean height, and Fcc data, the Fcc is believed to be the same regardless of the resin provided that the cured resin is capable of providing a precise replication of the tool surface.

The haze and clarity of the resulting films were measured as reported in previously described Tables I and J.

Examples 7-18

First Prism Film

Using the same tools, i.e. Tools 1 and 2, microstructured diffuser layers were cast and cured onto a primed side of a 1.14 mil PET film wherein the opposing major surface of the PET film had prism structures cast and cured according to the process described in U.S. Pat. Nos. 5,175,030 and 5,183,597 using a master tool produced according to the process described in US2009/0041553. The prism structures had a sharp 90° apex angle as defined by the slope of the sides of the prisms with the mean distance between adjacent apices being about 24 micrometers.

Stack of First and Second Prism Films

The microstructured diffuser layer of the first prism film was coated with adhesive as previously described and bonded to optically inactive bonding portions (e.g. post structures extending from the prism apices) of a second prism film (Film D as described in WO 2012/138495) The prism films were bonded such that the apices of the second prism film were orthogonal to the apices of the first prism film.

All the following examples had a low reflective moiré. The effective transmission (ET) of the resulting film stacks were as follows:

Properties of Prism Film Stack with
Microstructured Diffuser of Tool 1

|  | RI | Coating Caliper (µm) | Avg ET |
|---|---|---|---|
| Ex. 7 | 1.65 | 3 | 2.21 |
| Ex. 8 | 1.65 | 4 | 2.23 |
| Ex. 9 | 1.65 | 5 | 2.23 |

Properties of Prism Film Stack with
Microstructured Diffuser of Tool 2

|  | RI | Adhesive Caliper (µm) | Avg ET |
|---|---|---|---|
| Ex. 10 | 1.56 | 3 | 2.23 |
| Ex. 11 | 1.56 | 4 | 2.24 |
| Ex. 12 | 1.56 | 5 | 2.23 |
| Ex. 13 | 1.65 | 3 | 2.17 |
| Ex. 14 | 1.65 | 4 | 2.19 |
| Ex. 15 | 1.65 | 5 | 2.18 |

Tool 3 and Tool 4 were utilized to prepare microstructured surfaces from a UV polymerizable acrylate resin having a RI of 1.56. Tool 3 had asymmetrical microstructures and was prepared using a diamond turning system that utilizes a fast tool servo (FTS) as previously described. Tool 4 had symmetrical structures and was prepared according to U.S. Patent Application Ser. No. 61/728,868, filed Nov. 21, 2012.

Confocal scanning laser microscopy images of the microstructured surfaces were created as previously described. The microstructured surfaces produced are depicted in FIGS. 15A and 16A.

The complement cumulative slope magnitude distribution (Fcc) is shown in FIG. 17. This same data in tabular form is reported in previously described Tables C and D.

Tools 3 and 4 were used to prepare a "first" prism film and stack of first and second prism films in the same manner as Examples 7-15. The average effective transmission (ET) for Examples 16 and 17 was 2.24.

What is claimed is:

1. A microstructured diffuser comprising:
a light transmissive film comprising a first microstructured surface comprising a plurality of peaks and valleys, at least 90% of the first microstructured surface having a slope magnitude less than 20 degrees; and
a coating disposed on the first microstructured surface wherein the coating partially fills the valleys forming a second microstructured surface having a geometry that substantially differs from a geometry of the first microstructured surface such that the first and second microstructured surfaces are each characterized by at least one optical or physical property and the difference in optical or physical property between the first and second microstructured surfaces has an absolute value of at least 10%.

2. The microstructured diffuser of claim 1 wherein the difference in optical or physical property between the first and second microstructured surfaces has an absolute value of at least 15%.

3. The microstructured diffuser of claim 1 wherein the first and second microstructured surfaces each have a complement cumulative slope magnitude distribution and the difference at a slope magnitude greater than 2.1 degrees between the first and second microstructured surfaces is at least 10%.

4. The microstructured diffuser of claim 3 wherein the difference at a slope magnitude greater than 2.1 degrees between the first and second microstructured surfaces is at least 20%.

5. The microstructured diffuser of claim 3 wherein the difference is at a slope magnitude greater than 4.1 degrees.

6. The microstructured diffuser of claim 1 wherein the first and second microstructured surfaces each have a haze and the difference in haze between the first and second microstructured surfaces is at least 10%.

7. The microstructured diffuser of claim 6 wherein the difference in haze between the first and second microstructured surfaces is at least 20%.

8. The microstructured diffuser of claim 1 wherein the first and second microstructured surfaces each have a clarity and the difference in clarity between the first and second microstructured surfaces is at least −10%.

9. The microstructured diffuser of claim 8 wherein the difference in clarity between the first and second microstructured surfaces is at least −20%.

10. The microstructured diffuser of claim 1 wherein the peaks are free of matte particles.

11. The microstructured diffuser of claim 1 wherein the first microstructured surface is fabricated by casting and curing a polymerizable resin composition in contact with a tool surface.

12. The microstructured diffuser of claim 1 wherein the first microstructured surface has a complement cumulative slope magnitude distribution at a slope magnitude greater than 2.1 degrees of at least 90% and the second microstructured surface has a complement cumulative slope magnitude distribution at a slope magnitude greater than 2.1 degrees of less than or equal to 80%.

13. The microstructured diffuser of claim 1 wherein the first microstructured surface has a complement cumulative slope magnitude distribution at a slope magnitude greater than 4.1 degrees of at least 60% and the second microstructured surface has a complement cumulative slope magnitude distribution at a slope magnitude greater than 4.1 degrees of less than or equal to 50%.

14. The microstructured diffuser of claim 1 wherein the first microstructured surface has a haze of at least 50% and the second microstructured surface has a haze of less than or equal to 40%.

15. The microstructured diffuser of claim 1 wherein the first microstructured surface has a clarity of at less than 10% and the second microstructured surface has a clarity of at least 15%.

16. The microstructured diffuser of claim 1 wherein the microstructured diffuser comprises geometrically symmetric or geometrically asymmetric microstructures.

17. The microstructured diffuser of claim 1 wherein the light transmissive film further comprises prism structures on a major surface opposing the first and second microstructured surfaces.

18. An optical film stack comprising:
a first optical film comprising a plurality of structures comprising an optically active portion designed primarily to provide optical gain on a first surface bonded to a second microstructured surface layer of the microstructured diffuser of claim 1 with an adhesive layer such that a portion of the structures penetrate the adhesive layer and a separation is provided between the adhesive layer and the first surface.

19. The microstructured diffuser of claim 1 wherein the difference in optical or physical property between the first and second microstructured surfaces has an absolute value of at least 20%.

* * * * *

UNITED STATES PATENT AND TRADEMARK OFFICE
CERTIFICATE OF CORRECTION

PATENT NO. : 10,928,563 B2  
APPLICATION NO. : 15/023437  
DATED : February 23, 2021  
INVENTOR(S) : Nathan Naismith Page 1 of 1

It is certified that error appears in the above-identified patent and that said Letters Patent is hereby corrected as shown below:

In the Specification

<u>Column 1</u>  
Line 37, Delete "roll;" and insert -- roll, --, therefor.

<u>Column 1</u>  
Line 40, Delete "during" and insert -- curing --, therefor.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*